US010581920B2

(12) United States Patent
Rajagopal et al.

(10) Patent No.: US 10,581,920 B2
(45) Date of Patent: *Mar. 3, 2020

(54) SECURE WEB CONTAINER FOR A SECURE ONLINE USER ENVIRONMENT

(71) Applicant: Authentic8, Inc., Mountain View, CA (US)

(72) Inventors: Ramesh Rajagopal, Los Altos, CA (US); Scott M. Petry, Portola Valley, CA (US); James K. Tosh, Fremont, CA (US); Peter K. Lund, San Francisco, CA (US); Fredric L. Cox, San Jose, CA (US); Adam P. Moore, San Francisco, CA (US)

(73) Assignee: Authentic8, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/036,813

(22) Filed: Jul. 16, 2018

(65) Prior Publication Data

US 2018/0332080 A1  Nov. 15, 2018

Related U.S. Application Data

(63) Continuation of application No. 15/003,774, filed on Jan. 21, 2016, now Pat. No. 10,027,714, which is a
(Continued)

(51) Int. Cl.
*H04L 29/06* (2006.01)
*G06F 21/36* (2013.01)
(Continued)

(52) U.S. Cl.
CPC .............. *H04L 63/20* (2013.01); *G06F 21/36* (2013.01); *G06F 21/44* (2013.01); *G06F 21/53* (2013.01);
(Continued)

(58) Field of Classification Search
CPC .......... G06F 21/44; G06F 21/53; G06F 21/36; H04L 63/20; H04L 63/1433; H04L 63/10; H04L 63/08; H04L 63/168
See application file for complete search history.

(56) References Cited

U.S. PATENT DOCUMENTS 6,138,168 A  10/2000  Kelly et al.
6,347,306 B1  2/2002  Swart
(Continued)

FOREIGN PATENT DOCUMENTS

EP  1233333 A1  8/2002
WO  2008-156924 A1  12/2008

OTHER PUBLICATIONS

Tiwari, Auy, et al., "A multifactor security protocol for wireless payment-secure-web authentication using mobile devices", Retrieved from https://arxiv.org/ftp/arxiv/papers/1111/1111.3010.pdf, arXiv preprint arXiv:1111.3010 (2011), 8 pages.
(Continued)

*Primary Examiner* — Saleh Najjar
*Assistant Examiner* — Feliciano S Mejia
(74) *Attorney, Agent, or Firm* — Baker & McKenzie LLP

(57) ABSTRACT

Disclosed herein are systems and methods that allow for secure access to websites and web-based applications and other resources available through the browser. Also described are systems and methods for invocation of a secure web container which may display data representative of a requesting party's application at a user's machine. The secure web container is invoked upon receipt of an API call from the requesting party. Thus, described in the present specification are systems and methods for constructing and destroying private, secure, browsing environments (a secure disposable web container), insulating the user and requesting parties from the threats associated with being online for
(Continued)

the purposes of providing secure, policy-based interaction with a requesting party's online services.

20 Claims, 10 Drawing Sheets

Related U.S. Application Data continuation of application No. 14/531,837, filed on Nov. 3, 2014, now Pat. No. 9,246,904, which is a continuation of application No. 13/844,026, filed on Mar. 15, 2013, now Pat. No. 8,881,227, which is a continuation-in-part of application No. 13/076,421, filed on Mar. 30, 2011, now Pat. No. 8,776,169.

(60) Provisional application No. 61/319,250, filed on Mar. 30, 2010.

(51) Int. Cl.
  G06F 21/44 (2013.01)
  G06F 21/53 (2013.01)
(52) U.S. Cl.
  CPC .............. *H04L 63/08* (2013.01); *H04L 63/10* (2013.01); *H04L 63/1433* (2013.01); *H04L 63/168* (2013.01)

(56) References Cited

U.S. PATENT DOCUMENTS

| | | | |
|---|---|---|---|
| 6,704,024 B2 | 3/2004 | Robotham et al. | |
| 6,963,916 B1* | 11/2005 | Pugaczewski | H04L 41/0806 709/218 |
| 7,120,142 B1 | 10/2006 | Oz et al. | |
| 7,334,254 B1* | 2/2008 | Boydstun | H04L 63/105 726/1 |
| 7,363,363 B2* | 4/2008 | Dal Canto | H04L 63/0272 379/201.04 |
| 7,774,363 B2 | 8/2010 | Lim | |
| 7,779,034 B2 | 8/2010 | Pedersen et al. | |
| 7,934,253 B2 | 4/2011 | Overcash et al. | |
| 7,958,012 B2 | 6/2011 | Hudak et al. | |
| 8,112,791 B2* | 2/2012 | Kiester | G06F 21/31 726/18 |
| 8,266,685 B2 | 9/2012 | Abzarian et al. | |
| 8,306,807 B2 | 11/2012 | Van Guilder et al. | |
| 8,332,626 B2 | 12/2012 | Mansfield | |
| 8,375,434 B2 | 2/2013 | Cottrell et al. | |
| 8,443,416 B2 | 5/2013 | Sabin et al. | |
| 8,484,718 B2 | 7/2013 | Chacko et al. | |
| 8,555,273 B1 | 10/2013 | Chia et al. | |
| 8,589,338 B2 | 11/2013 | Maes | |
| 8,615,795 B2 | 12/2013 | Cottrell et al. | |
| 8,763,082 B2* | 6/2014 | Huber | G06Q 20/1235 726/3 |
| 8,844,043 B2 | 9/2014 | Williams et al. | |
| 8,868,724 B2 | 10/2014 | Goodwin et al. | |
| 8,881,227 B2 | 11/2014 | Rajagopal et al. | |
| 8,984,621 B2* | 3/2015 | Burch | G06F 9/455 726/15 |
| 9,075,895 B2 | 7/2015 | Lindsey et al. | |
| 9,246,904 B2 | 1/2016 | Rajagopal et al. | |
| 9,306,972 B2 | 4/2016 | Amiga | |
| 9,313,227 B2 | 4/2016 | Amiga | |
| 9,379,895 B2 | 6/2016 | Kailash et al. | |
| 9,391,832 B1 | 7/2016 | Song et al. | |
| 9,514,106 B2* | 12/2016 | Yamamoto | G06F 17/2247 |
| 9,521,118 B2 | 12/2016 | Cottrell et al. | |
| 9,537,873 B2 | 1/2017 | Petry et al. | |
| 9,712,386 B1 | 7/2017 | Chen et al. | |
| 9,787,637 B2 | 10/2017 | Petry et al. | |
| 10,027,625 B2 | 7/2018 | Petry et al. | |
| 10,027,714 B2 | 7/2018 | Rajagopal et al. | |

| | | | |
|---|---|---|---|
| 2003/0050932 A1 | 3/2003 | Pace | |
| 2003/0120593 A1 | 6/2003 | Bansal et al. | |
| 2003/0135543 A1 | 7/2003 | Kittredge et al. | |
| 2003/0187689 A1 | 10/2003 | Barnes et al. | |
| 2004/0049702 A1 | 3/2004 | Subramaniam et al. | |
| 2004/0107360 A1 | 6/2004 | Herrmann et al. | |
| 2004/0205101 A1 | 10/2004 | Radhakrishnan | |
| 2004/0239681 A1 | 12/2004 | Robotham et al. | |
| 2005/0097353 A1 | 5/2005 | Patrick et al. | |
| 2006/0005008 A1 | 1/2006 | Kao | |
| 2006/0041755 A1 | 2/2006 | Pemmaraju | |
| 2007/0016949 A1 | 1/2007 | Dunagan et al. | |
| 2007/0101435 A1 | 5/2007 | Konanka et al. | |
| 2007/0115990 A1 | 5/2007 | Asati et al. | |
| 2007/0214359 A1 | 9/2007 | Williamson | |
| 2008/0016551 A1 | 1/2008 | Pinkas et al. | |
| 2008/0184358 A1* | 7/2008 | Stamos | H04L 63/04 726/11 |
| 2008/0271020 A1 | 10/2008 | Leitz et al. | |
| 2009/0187919 A1 | 7/2009 | Maes | |
| 2010/0024036 A1 | 1/2010 | Morozov et al. | |
| 2010/0057836 A1 | 3/2010 | Anbuselvan | |
| 2010/0125902 A1 | 5/2010 | Killian et al. | |
| 2011/0184993 A1 | 7/2011 | Chawla et al. | |
| 2011/0247045 A1 | 10/2011 | Rajagopal et al. | |
| 2013/0014259 A1 | 1/2013 | Gribble et al. | |
| 2013/0290404 A1 | 10/2013 | Rajabi et al. | |
| 2013/0335436 A1 | 12/2013 | Lindsey | |
| 2013/0340028 A1 | 12/2013 | Rajagopal et al. | |
| 2015/0106683 A1 | 4/2015 | Lindsey et al. | |
| 2015/0222600 A1 | 8/2015 | Cottrell et al. | |
| 2016/0352803 A1 | 12/2016 | Amiga et al. | |
| 2017/0034190 A1 | 2/2017 | May | |
| 2017/0111318 A1 | 4/2017 | Petry et al. | |
| 2017/0208079 A1 | 7/2017 | Cammarota et al. | |
| 2017/0223029 A1 | 8/2017 | Sharma et al. | |
| 2018/0034773 A1 | 2/2018 | Petry et al. | |

OTHER PUBLICATIONS

Tom Scholl, "Internet Routing and Traffic Engineering", AWS Architecture Blog, Retrieved from https://aws.amazon.com/blogs/architecture/internet-routing-and-traffic-engineering/, Published Dec. 15, 2014 (Year:2014), 14 pages.

International Search Report and the Written Opinion of the International Searching Authority in connection with PCT Application No. PCT/US2016/018828, dated Jun. 8, 2016, 10 pages.

Koved, Larry, et al.., "Security challenges for Enterprise Java in an e-business environment", Retrieved from http://ieeexplore.ieee.org/stamp.jsp?arnumber=5386964, IBM Systems Journal 40.1 (2001): 130-152, Published 2001, 23 pages.

Guitart, Jordi et al., "Characterizing secure dynamic web applications scalability", Retrieved from http://ieeexplore.ieee.org/stamp/stamp.jsp?arnumber=1419933,19th IEEE International Parallel and Distributed Processing Symposium, IEEE, Published 2005, 10 pages.

International Search Report and Written Opinion dated Aug. 23, 2011 in connection with International Application No. PCT/US2011/030620, 7 pages.

Tzi-cker Chiueh, et al., "Spout: a transparent proxy for safe execution of Java applets", in Selected Areas in Communications, IEEE Journal, vol. 20, No. 7, pp. 1426-1433, Sep. 2002, Web Accessed; Sep. 18, 2015, doi: 10.1109/JSAC, 2002.802074, URL: http://ieeexplore.ieee.org/stamp/stamp.jsp?tp-&arnumber1031912&isnumber=22158, 8 pages.

Berryman, A., et al., "VDBench: A Benchmarking Toolkit for Thin-Client Based Virtual Desktop Environments", (CloudCom), 2010 IEEE Second Intl Cont, pp. 480-487, Nov. 30-Dec. 3, 2010, Accessed; Sep. 18, 2015, doi: 10.1109/CloudCom.2010.106, URL: http://ieeexplore.ieee.org/stamp/stamp.jsp?tp+&arnumber=5708490&isnumber=5708426, 3 pages.

Lesueur, F., et al., "SAFE-OS: A secure and usable desktop operating system", 2010 Fifth Intl Conf., pp. 1-7, Oct. 10-13, 2010, Web Accessed; Sep. 18, 2015, doi: 10.1109/CRISIS.2010.5764916, URL: http://ieeexplore.ieee.org/stamp/jsp?tp=&arnumber=5764916&isnumber=5764913, 7 pages.

(56) References Cited

OTHER PUBLICATIONS

"Tab (GUI: Difference between revisions)", Wikipedia, Wikimedia Foundation, published Apr. 19, 2009, Accessed Web, Apr. 18, 2014, <http://en.wikipedia.org/w/index.php?title=Tab_(GUI)&diff=284321974&oldid=283>, 1 page.
"Internet Explorer—7—Wikipedia, the free encyclopedia", Wikipedia, the free encyclopedia, published Apr. 9, 2009, Accessed—Web. Oct. 10, 2013, <http://en.wikipedia.org/w/index.php?title=Internet_Explorer_7&oldid=282788819>, 8 pages.
Petry et al., U.S. Appl. No. 16/036,822, 124 pages.
Petry et al., U.S. Appl. No. 15/454,915, 383 pages.
Petry et al., U.S. Appl. No. 16/036,846, 145 pages.
Petry et al., U.S. Appl. No. 16/181,324, 153 pages.

* cited by examiner

FIG. 6

My Accounts

| Name | URL |
|------|-----|
| Tmail | https://www.giggle.com/accounts/ServiceLogi... |
| Facepage | http://www.facepage.com/ |

Settings:

The settings link on the bottom right allows you to view your login history, change your A8 password or change the trust settings of the computers you use to connect to Authentic8.

Support:

The User Guide is a great place to start. It may already contain the answer to your question.

The User Forum is also a great place to get help. Someone else has probably had the same question - try it!

Telephone: 650-409-6139
9:00 AM to 6:00 PM
Monday thru Friday (Pacific Time)

Email:
support@authentic8.com

🔒 Authentic8.com    🔒 OSMoSis Blog    🔒 User Forums    🔒 User Guide

© 2011  Authentic8 | Privacy Policy | Terms of Service | Copyright Policy    Settings

SECURE WEB CONTAINER FOR A SECURE ONLINE USER ENVIRONMENT

CROSS-REFERENCE TO RELATED APPLICATIONS

This patent application is a continuation of U.S. patent application Ser. No. 15/003,774 entitled "Secure web container for a secure online user," filed Jan. 21, 2016, which is a continuation of U.S. patent application Ser. No. 14/531,837 entitled "Secure web container for a secure online user environment," filed Nov. 3, 2014, which is a continuation of U.S. patent application Ser. No. 13/844,026 entitled "Secure web container for a secure online user environment," filed Mar. 15, 2013, which is a continuation-in-part of U.S. patent application Ser. No. 13/076,421, entitled "Disposable browsers and authentication techniques for a secure online user environment," filed Mar. 30, 2011, which claims priority to provisional patent application No. 61/319,250, entitled "Methods to securely authenticate and access remote web browser and downstream web applications," filed Mar. 30, 2010, all of which are incorporated herein by reference for all purposes.

BACKGROUND

Service providers are increasingly looking to deliver sensitive aspects of their services in a secure, seamless manner to their users or customers. This is because users of these services are increasingly conducting important and sensitive business and other activities online. For example, healthcare providers, financial services providers, and other online service providers may offer online services such as providing healthcare records, portals for banking, paying bills, or secure communications regarding any of these items. With all of the confidential information communicated through web browsers online, service providers and users of their services are accordingly vulnerable to theft of their identifying information through infected or otherwise compromised web browsers and through hijacked connections and spoofed destinations. Also, since consumers have difficulty in remembering and managing login credentials for the service providers they use, they set usernames and passwords that may be easy to recall and can be the same across all accounts, so access to one username and password pair might provide a thief with access to multiple of the users' accounts. Theft of login credentials, personal information, money, healthcare data, are all possible results. The range of risks is growing, and current secure browsing and authentication approaches do not satisfactorily address the need for complete security to ensure a safe online experience.

SUMMARY

Disclosed herein are systems and methods that allow for secure access to service providers' websites and web-based applications and other resources available through the browser upon validation of an Application Programming Interface ("API") call received from such a service provider. Also described are systems and methods for secure use and retention of requesting party and/or user policies, profiles, and/or parameters, etc. Also described are systems and methods for secure use and retention of user credentials, as well as methods for dynamic authentication of users and security for applications allowing user access, such as for banking, ecommerce, or other application where maintaining the integrity of the service provider application as well as the user data and user machine are important. Thus, described in the present specification are systems and methods for constructing and destroying private, secure, browsing web containers, insulating the user and the service from the threats associated with being online for the purposes of providing secure, policy-based interaction with online services.

Example embodiments in which the described embodiments could be used would include online banking customers accessing a bank website. When the customer accesses the online banking website, the banking website could initiate an API call to an associated application on the user client machine, providing for the initiation of a secure web container session in which an interface is presented that appears to the user as a browser window, but which is actually a disposable browser window or other disposable secure browser rendering framework that is a completely graphical-based interaction over an encrypted channel in which any data established as a part of the session is maintained in a segregated and encrypted space and wherein any HTML communications actually occur between the interposed security service described herein and the banking website servers. Such an approach insulates the bank from the need to interact with potentially compromised user client-based browsers and provides for a well-controlled and highly private environment for interaction between the bank and its customers.

By the same token, the described approach could be initiated by a health care provider to interact with its online customers. Thus, in an analogous way when a customer accesses the health care provider website and seeks personal information or attempts to transact online commerce with the healthcare provider, the healthcare provider website could instantiate an API call to a user client machine to establish a secure web container session as described herein. The description of the foregoing banking and health care provider implementations should not be considered to be limiting in anyway, and the implementations described in the present application may be broadly and usefully implemented in any application where browser and transactional security are a concern.

Accordingly, although the present application is generally directed to systems and methods in which there is provided secure access to service providers' websites and web-based applications and other resources available through a secure web container upon validation of an API call, it should also be appreciated that these systems and methods are a part of an overall secure ecosystem with multiple security and authentication features. Additionally, although there are references in particular embodiments to "secure disposable browsers," "secure web containers" and "secure web rendering frameworks," it should be appreciated that, depending upon context, these terms may be used interchangeably to refer to the presentation of web images to a user in a secure embodiment, and the terminology is used in different contexts according to the end use that is being described at the time.

Once a user has been authenticated through techniques described in this application or through requesting party authentication or user authorization techniques, the user's activities are carried out and protected within the secure web container as described further below, the effect of which is to remove the user's inputs and machine from being directly exposed and vulnerable to the public internet and which also insulates the service provider web application from access by malicious applications or users. In addition, the web content delivered within the secure web container is run within a protected sandbox and is therefore dislocated and insulated from vulnerabilities that may live on the end user's machine or elsewhere. Within this secure web container, the user and service provider are able to conduct a full spectrum of activities. Once a session is ended, all user-identifiable attributes, account information, service provider information, and any other commercially sensitive information associated with the transaction can be disposed of. At the user's option or by option of the service provider, such information may be maintained in separate secure storage to be re-instantiated in a new session when a user logs in from the same or another client machine.

The advantages of the secure service environment, a component of which is a secure web container as described below, comprise at least the following facets—security, preconfigurability, policy control, and disposability. With regard to security, the secure web container runs within a secure "jailed" environment within the secure service environment. The secure web container code accordingly is processed within the secure service environment and not on the local client machine. Through this approach, the service renders only images of web pages on a user's machine, while keeping the code-rendering engine at the secure service environment, dislocated from the user and the user machine. This process of dislocating the execution of web code from the user display of the web page enables security scanning and malware handling at the secure service environment, and prevents malware from reaching the end-user machine or the service provider web server through often-vulnerable local machine-resident web browsers, and provides an encrypted and image-based communication method that insulates the private web content from interception and possible malicious use. The service may be co-located with a service provider's systems or may also be remotely located from the service provider's systems.

With regard to the preconfigurability of the secure web container, a system is in place to maintain key elements of the user's profile and/or a service provider's profile (with their consent/selection of this option) and instantiates those key elements when the user or a service provider requests a new disposable container session. The new secure web container session accordingly may be populated with merchant accounts, user credentials, user bookmarks/favorites, browser histories, plug-ins, extensions, and session states associated with the user's previous disposable container session(s).

Regarding the policy control element of the secure web container, such policy control provides a framework for enabling an authorized party to establish use policies for how the secure web container is used by users. Authorized parties can include the users themselves, parents, IT administration personnel, the service provider, and others according to design need. Policies can include access rules, content filtering, authentication, data handling (upload/download, print), session tracking, logging, monitoring, private browsing (cookie handling, IP masking and the like), validation of downstream sites, time- or geography-based rules, and rules governing access machines, etc.

Regarding the disposability of the secure web containers, this provides for building from scratch, per user, per requesting party (service provider), per session, aspects of a secure web container session and then disposing of all associated data at session termination. At the option of an authorized party or according to policy, session and other data can be stored in the secure environment to be accessed later.

For authentication of users, the disclosed systems and methods use dynamic authentication techniques that are adaptable according to a user's configured profile and/or a requesting party's configured profile with the system as well as environment variables around which a user or requesting party (or someone purporting to be the user or requesting party) presents himself or herself or interacts with the secure service environment. In conjunction with the described secure browsing environment, the combination of all these features provide a synergistic combination of techniques that ensures online security.

In an embodiment, the secure service environment is a secure web container service environment. The secure web container service environment embodiment utilizes a "push" model, as opposed to a "pull" model where a user initiates the service at the user's own initiative to access multiple user-requested downstream websites through a secure web rendering framework that appears to the user as browser through which the user is able to access any number of downstream websites as if using a browser client on the user's client machine. With further reference to the disclosed push embodiment, however, in this implementation a website owner or other service provider asks the secure web container service environment to contain its content in a secure web container and deliver it to the user via the disclosed "push" model using API calls. When a user clicks on a link or accesses a webpage via his or her local browser, the website owner passes an API call to the secure web container service environment. The secure web container service environment instantiates the browser rendering framework (that may be configured to appears to the user as a web browser), populates it with page data (or empty), and pushes the display to the user. From the user's perspective, the user sees another window or a tab, and does not go through any other connection process.

It should be appreciated that the requesting party can invoke requests from contexts other than online services or websites. It could be any application or service that would call the API to deliver secure web content, such as a local email application, a user support or ticketing system, or any of a number of other applications that might invoke a need for secure user interaction.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components be omitted in certain figures for clarity of discussion. Reference is now made to the following descriptions taken in conjunction with the accompanying drawings, in which:

FIG. 6 illustrates an exemplary "home page" screen a user might see when interfacing with the secure service environment described in FIGS. 2, 3, and 4, in accordance with the present disclosure;

These exemplary figures and embodiments are to provide a written, detailed description of the inventions set forth by any claims that issue from the present application. These exemplary figures and embodiments should not be used to limit the any claims that ultimately issue in a patent from the present application.

DETAILED DESCRIPTION

General Architecture of Secure Web Container Environment

Figure 1:
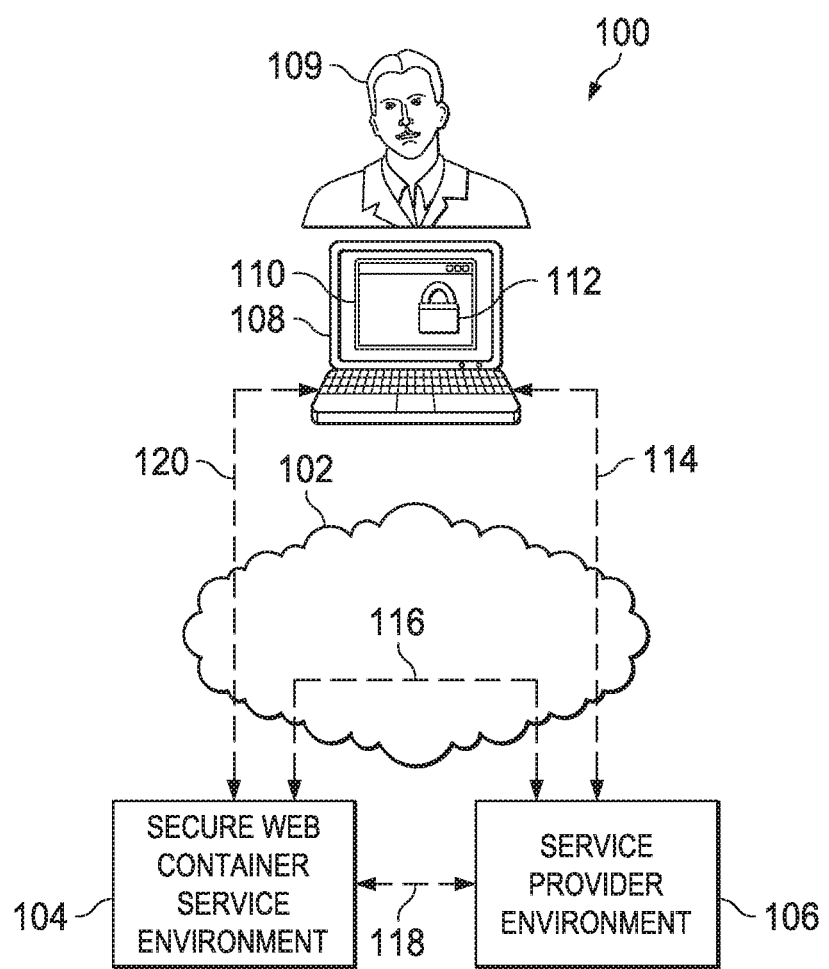
FIG. 1 illustrates a system for providing a secure disposable browser to a user of a service provider, in accordance with the present disclosure.

FIG. 1 illustrates a system 100 for providing secure web content to a user 109 of online services 110 of a given service provider 106. The secure web content may be pushed to the user's device 108 at the discretion and determination of the service provider 106.

The user 109 has a device 108 for viewing online services 110. The device 108 is in communication with the service provider's environment 106 via connection 114 and with a secure web container service environment 104 via connection 120 over the internet, cloud, or remote network 102. Further, the secure web container service environment 104 is in communication with the service provider environment 106. In an embodiment, the secure web container service environment 104 is located remotely from the service provider environment 106 and is in communication with the service provider environment 106 via connection 116 over the internet, cloud, or remote network. In another embodiment, the service provider environment 106 and secure web container service environment 104 are co-located and are connected via connection 118 over a secure, local network.

When the user 109 accesses the services of the service provider, the service provider may provide online services 110 to the user's device 108. When the user 109 navigates to some secure functionality or content of the online services 110 provided by the service provider 106, or at any point at which the service provider 106 determines to provide some secure functionality or content to the user 109, the service provider environment is prompted by the service provider environment 106 to invoke a secure web container 112 to display the secure functionality or content to the user 109. To invoke the secure web container 112, the service provider environment 106 sends an API call to the secure web container service environment 104 via connection 116 or connection 118. The secure web container service environment 104 then provides a secure web container 112 and displays images representative of service provider's application web content at the user device 108 based on the API call. These embodiments are discussed in further detail in relation to FIGS. 9-12C. General principles and functionality is also discussed below in relation to FIGS. 2-8.

Figure 2:
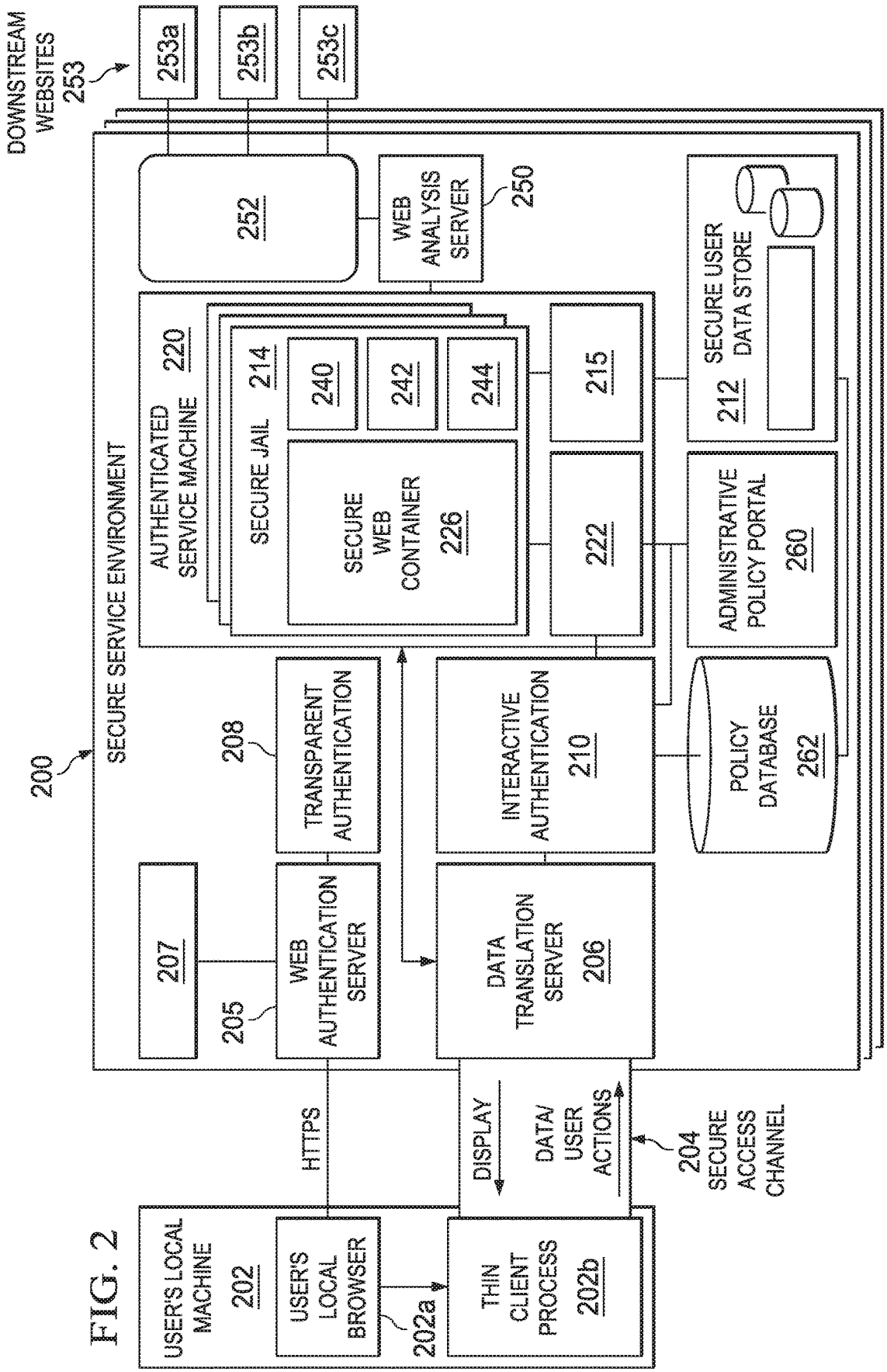
FIG. 2 illustrates a high-level service architecture for providing a secure web container within a private user environment within the secure service environment, in accordance with the present disclosure.

FIG. 2 is a high-level diagram generally describing the user interaction and back-end operations of a secure service environment 200. After authentication, which is described further below, a secure web container 226 is constructed within the secure service environment 200, which is operated securely and remotely from the end user's (potentially compromised) local machine 202. The secure web container 226 is further "disposable" because it is constructed at the initiation of a browsing session and destroyed at the end of a session (along with any session or other data that the user does not wish to persist).

As discussed further in relation to FIGS. 9-12C, an embodiment of the secure service environment 200 may be a secure web container service environment set up through an API call as illustrated therein. User credentials and other personal information are stored and accessed entirely within the secure service environment 200 and are never shared with the user's local machine 202. Through this approach, all web code is delivered to and executed within the secure web container 226, itself within a private user area or secure jail 214 operating on an authenticated service machine 220 within the secure service environment 200.

The disclosed architecture for the service is capable of supporting the API model as well as a number of generalized secure web container service environments. The API/push model as specifically described herein in relation to FIGS. 9-12C is a particular application of the secure web container 226. Although the present patent application is directed to the API/push model as described herein, the enabling technologies described herein are intended to be additional embodiments in either or any such embodiments according to design requirements.

Enabling Technologies for Authentication and Secure Web Container

As previously mentioned, the present application is generally directed to systems and methods in which there is provided secure access to service providers' websites and web-based applications and other resources available through a secure web container upon validation of an API call. It should also be appreciated, however, that these systems and methods are a part of an overall secure ecosystem with multiple security and authentication features. Before later describing the more specific elements of the systems and methods for providing secure web containers as a part of an API call as particularly described in FIGS. 9-12C, features of the secure ecosystem that may enable or otherwise be used in conjunction with any of these embodiments are described immediately below.

As a part of the overall disposable browsing system, the web code received by the secure disposable browser 226 within the secure service environment 200 is translated using a network and application protocol and delivered (via a data translation server 206) to the end user's local machine 202 as encrypted display data over a secure access channel 204. The thin client process 202b on the end user's local machine 202 decrypts and renders this data to the user as an image or rendering of the browser running within the secure service environment 200.

Operating through this system, user-generated inputs (keystrokes, mouse input, etc.) are transmitted back to the data translation server 206 via the same network and application protocol (as described above) over the secure access channel 204 and accordingly to the secure disposable browser 226, which then passes those inputs back to the original end service provider's website 253. The secure disposable browser 226 is built per user on-demand, and it is therefore free of malware at initiation. Upon session completion, the secure disposable browser 226 and all transient session data may be purged, protecting both user client machine and the service provider's application environment.

Still referring to FIG. 2, to maintain the security of a user's access to his or her personal data and web applications through the secure service environment 200, as well as to protect the service provider's service environment from malicious access, the user is first authenticated. Various embodiments of that authentication process will now be described. The user may access the secure service environment 200 initially through a standard local browser 202a running on the user's local machine 202, via an encrypted HTTPS connection, connecting to a web authentication server 205. The web authentication server 205 operates code comprising computer instructions stored on a computer-readable medium 207. The computer instructions comprise instructions for conducting a transparent authentication process, which when operational comprises process 208.

The transparent authentication process 208, which will be described in greater detail below, uses various clues to set the confidence interval around the user access attempt. Generally speaking, various environmental parameters regarding the user's access attempt are deemed to be either consistent or inconsistent with expected parameters for that user. Access using a user's known or trusted local machine, during a usual time, from a typical geographical location and with consistent hardware and software parameters etc., will yield a higher level of confidence around the authenticity of the user's access attempt.

Once the transparent authentication process 208 is completed, the user is provided with a secure web container such as secure disposable browser 226 within a secure user environment (or secure jail 214) by an authenticated service machine 220 within the secure service environment 200. The interactive authentication process 210 can now be run with computer instructions stored in the computer-readable medium, secure user data store 212. The interactive authentication process 210 employs user-customized and/or defined processes, which may also be stored, in part, in the secure user data store 212. Upon a successful authentication, the user is provided with authenticated access to the secure disposable browser 226. Each user is given their own secure disposable browser 226 within a secure jail 214 such that each user's personal information and disposable browser application is insulated from each other user's, and the jail is also a part of a computer-readable medium 215 contained within the authenticated service machine 220 for storing multiple such user environments or secure jails 214 in a secure and isolated fashion. Once successfully completing the authentication processes 208, 210, the user through their local machine 202 is connected to the secure disposable browser 226 or other secure web container operating within a secure jail 214 running in the authenticated service machine 220, which similarly operates computer code stored with computer-readable instructions stored on a computer-readable medium 222.

One set of instructions operated by the authenticated service machine 220 establishes a secure disposable browser 226 within a per user secure jail 214 in the secure service environment 200. The secure disposable browser 226 instruction codes are also stored in computer-readable medium 222 or on another computer-readable medium. Although the secure disposable browser or other secure web container 226 appears as a window display on the end user's local machine 202, it is actually operating within a secure jail 214 on an authenticated service machine 220 within the secure service environment 200. Accordingly, the secure disposable browser 226 insulates the end user from the vulnerabilities that are associated with user's local machine-resident browsers which are directly exposed to web code on the internet. Coupled with the advantageous authentication techniques described herein, the secure service environment 200 provides greatly enhanced security relative to known solutions, and once a user is operating within the secure service environment 200, he or she is able to securely perform any of a number of additional tasks securely, and the service is able to provide coordination of the users' access to multiple secure websites, including e-commerce, banking or healthcare websites or conduct any other online activities deemed sensitive.

To provide secure storage and access to user account information and user data, a secure user data store 212 communicates securely over an encrypted network with the authenticated service machine 220. The secure data store 212 contains user-specific information that supports the functionality within the secure disposable browser 226. This includes data to authenticate and access the secure service environment 200, to potentially customize the secure disposable browser 226 with user specific preferences (including accounts, favorites, bookmarks, history, etc.) as well as to support other applications within the secure disposable browser 226, such as a secure mail portal 240, a document lockbox 242, and a reports and settings configuration application 244, all of which are applications executable by the authenticated service machine 220 when retrieved from an associated computer-readable medium, such as computer-readable medium 222. Further, the secure service environment allows for fetching of the credentials from the computer-readable medium 222 to allow for the user to login to various items such as their email, lockboxes, or other account aspects. The secure service environment then further provides a secure disposable browser 226 such that on the user's local machine 202, they would see their service web interface presented to them on a tabbed window.

Regarding the secure email portal 240, the disclosed system and method provides the ability to replace the user's email address on record with downstream service providers with an obscured and non-identifiable (yet user- and vendor-unique) email address controlled by the secure service environment 200. This results in emails from a service provider arriving at this secure, hosted email portal 240. The disclosed system and method thereby ensures the validity and authenticity of the email messages from each provider. The analysis of the validity and authenticity of email messages can include analysis of the sending server from where the message originated (domain to IP matching) as well as examining the integrity of message metadata to ensure authenticity. Users can then use the email portal 240 to manage their sensitive email communications with these chosen downstream websites 253. The secure email portal allows for different logical displays, including chronological or by service provider. The users can be informed of new messages in their secure portal inbox by sending notification emails to their personal email account, via an icon on their local machine 202, or via SMS to their mobile phone or other method.

Regarding the document lockbox 242, the disclosed system and method provides for interaction with the print/download functionality within web applications to offer the user convenient one-click view, print, save and search-enabled access functionality within the secure service environment. A user is accordingly able to view a document within a web application, "print to" PDF or similar transportable format and launch a viewer to physically print, or save to the document lockbox memory, which is a hosted and encrypted archive for statements/documents within the secure service environment 200 that the user can access and retrieve at times of their choosing. Users can annotate or add commentary to any document and have a logical view of their statements/documents by period or service provider. The service can also enable ingestion of other scanned documents into this lockbox via an upload mechanism from the user's machine or other local data store. Users may also be able to share documents with other users that are registered with the service. In this instance, a user may provide access and/or edit privileges to another user, enabling saved documents to be shared with a user or multiple user, without those documents being publically available or stored locally on any end user machine.

Still referring to FIG. 2, another disclosed embodiment in the present disclosure relates to providing usage policies per a policy database 262 and admin policy portal 260. These usage policies can be set by system administrators on behalf of one or multiple employees, by parents on behalf of one or more children, or otherwise by a one person on behalf of a group of people. Some or all of such policies can also be enabled and individually maintained by the users themselves according to their desired settings. Policies can be enforced globally for all actions taken from the disposable browser, or on a per account basis to give more fine-grained control over usage for particular online accounts. E.g., "log me out of all accounts after 5 minutes of inactivity", "force out-of-band authentication whenever I access www.mybank.com", "only allow access to www.mybank.com when I'm coming from my home IP". Particularly as the secure service environment 200 may be employed in a centralized, cloud-based environment, the setting of usage policies on behalf of multiple users by an administrator is easily facilitated, including the setting of usage policies, e.g., on a per-site basis or according to other defined user groups. These usage settings can be established by an admin or parent or other party with admin rights through the admin policy portal 260 communicating with the policy database 262. In the event that a user is configuring his or her own policies, this admin policy portal 260 can be accessed from within their secure disposable browser 226 connecting to the secure service environment 200 and in turn to the admin policy portal 260 over the secure access channel 204.

Figure 3:
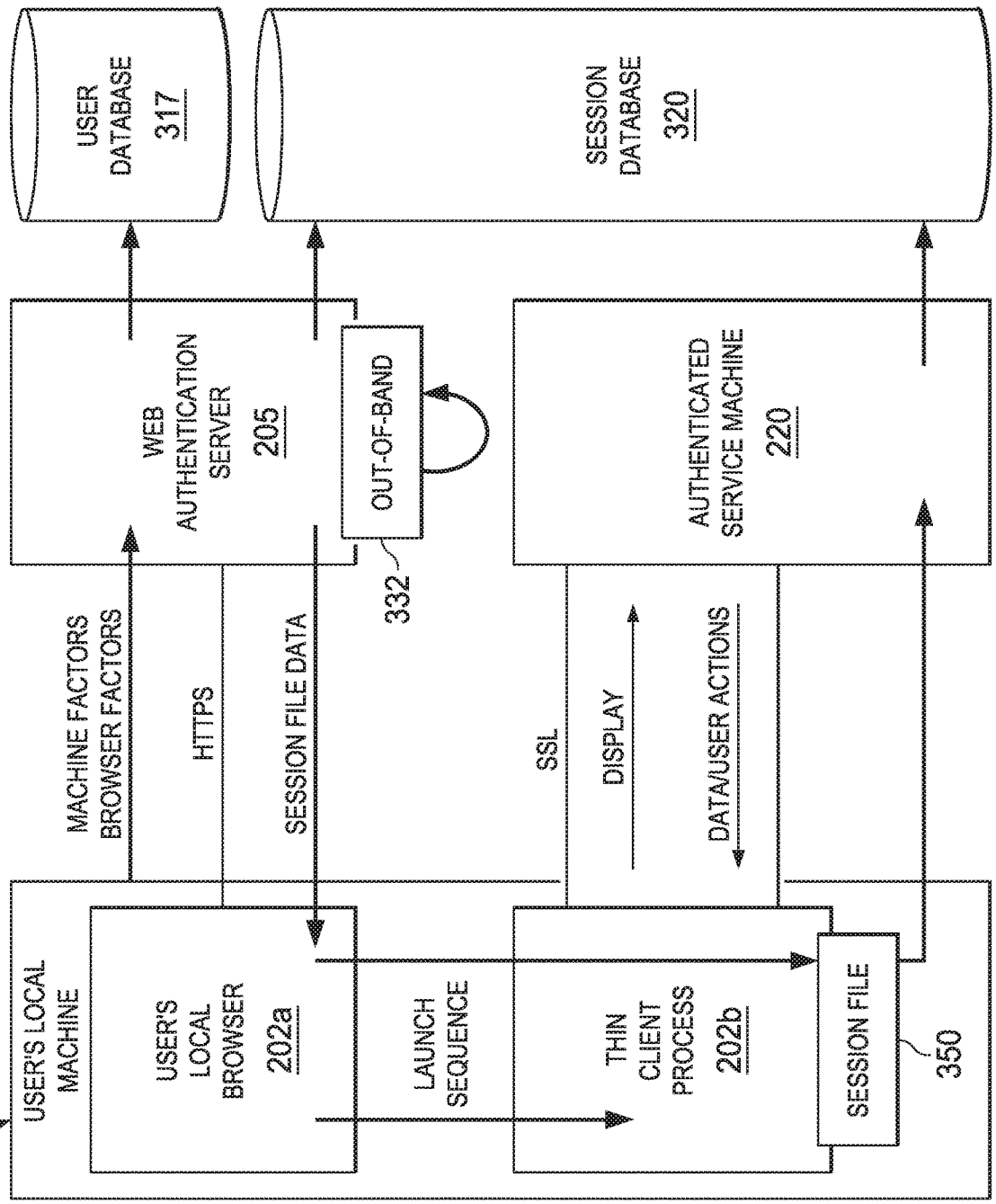
FIG. 3 illustrates a system for establishing an authenticated user session and a secure web container session in communication with a user's local machine, in accordance with the present disclosure.

Illustrated in FIG. 3 is another, functional-level view of the secure service environment 200 of FIG. 2. This figure illustrates the interaction between some of the system elements described in FIG. 2. While there are certain elements shown in FIG. 2 that are not illustrated in FIG. 3 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification.

Within the secure service environment 200 is a web authentication server 205 that provides for a user to connect to the secure service environment 200 for the purposes of initiating a log-in process, user and machine identification purposes, user-factor checking, browser-factor checking, machine-factor checking, and session-factor checking. For storing the various factors, a master list of profile data is stored in a user database 317, which is a component of the secure user data store 212. The web authentication server 205 is in communication with various sub components of the secure user data store 212. The user login attempt can made through the user's local machine 202, typically via the user's local browser 202*a*. When receiving a login attempt, the web authentication server 205 will reference the user database 317 and the session database 320 to cross-check data gathered during the login process, including authentication factors, from the login session against that stored in the database.

In the described approaches, at least some of the particular factors can be gathered from characteristics of the user's local machine 202, as will be further described below. As illustrated in FIG. 3, this system diagram provides another, consistent system view of the system illustrated in FIG. 2. As illustrated in FIG. 3, the web authentication server 205 is primarily responsible for responding to and handling requests to initiate the login process and brokering the transparent authentication process 208, whereas authenticated service machine 220 is primarily responsible for accepting the incoming connection request, performing the interactive authentication process 210, and managing the per-user jailed environment which contains the secure disposable browser or other secure web container 226 (see FIG. 2). As described above, this secure disposable browser 226 does not store user data on the user's local machine 202, so in conjunction with the described authentication techniques this method and system provides a high level of security for user credential data and other user data.

As a part of the above-described authentication process, when a user logs in to the secure service environment 200, the web authentication server 205 executes the login request against a hierarchy of authentication techniques, referencing the user factors previously stored in the user database 317, which is part of the secure user data store 212, with the aim of confirming the user's true identity (or detecting an imposter).

Initially, the web authentication server 205 examines factors associated with the user's login attempt using techniques that are transparent to the user. This enables the secure service environment 200 to place a preliminary "confidence interval" around user identity, where "confidence interval" refers to a certain degree of confidence that the user is who he or she purports to be and the extent to which the user's local machine 202 is recognized as being associated with the user's account, or possibly modified since previous login attempts. Depending upon this initial level of confidence, the web authentication server 205 can determine whether and what further transparent and/or non-transparent information is required from the user or the user's local machine 202.

Types of transparent information that can be garnered from a user's login attempt, such as through the session information gathered from the connection to the user's local machine 202, include browser factors, machine factors, and session factors, as further described below.

Browser Factors. Browser-related parameters that allow identification of user's local browser 202*a*, resident on the user's local machine 202 from which the login process is being initiated. Examples of such browser factors include: browser plug-in details, user agent, system fonts, cookies, super cookies, color depth, screen size and more. Many other factors associated with a particular browser revision or configuration can be detected, analyzed, and cross-checked against the user database 317.

Machine Factors. Specific attributes of the user's local machine 202 can be identified including by placing a unique digital certificate on the user's local machine 202. Particular aspects intrinsic to the user's local machine 202 can also be detected, including software and hardware components and serial numbers (e.g., MAC address, OS fingerprint, client application serial numbers, etc.). These various aspects can be detected directly or they can be built into an encrypted hash derived from a combination of these various factors. This information can be previously stored and then compared for authentication purposes against information within the user database 317.

Session Factors. A collection of session-related parameters can be detected and further used to identify and corroborate the user's identity. For example, IP address data can be used to determine the user's geographic location, and this location can be checked against expected user location according to static and/or dynamic information (user home bases, user travel patterns, possible travel patterns, etc.) stored in the user database 317 and associated with the user.

In addition to the above-described factor analysis, the secure service environment 200 can establish behavioral norms for the user, and is therefore further capable of checking for behavioral abnormalities as a part of the identification and authentication process. Indicators can include a user's typical login location, typical access device, time of day, or even a typical behavior pattern regarding activities on downstream sites, etc. Other available indicators incorporate logical assumptions that can be inferred from looking at recent activities such as change in login frequency, logging in from a different location over a short period of time, cross-checking the location of a user's computer against that of the user's mobile phone, and more.

Further beyond the browser/machine/session factors and the detected behavioral norms, the secure service environment 200 allows users (or admins on behalf of multiple users) to establish their own prescribed behavioral rules that can be reflected within the authentication framework, e.g., "I never log in from a public machine," "I rarely travel," "I'm a road warrior," "these are the only locations that I might log in from," "I'll never log in from abroad," "I'll never log in during these hours." Behavioral norms may be defined and applied as global policies, or can be defined and applied on a per-downstream website basis, establishing a policy specific to a particular website account or destination site, e.g., "only allow my home machine to connect to this bank account," etc. These policies are set in the policy database 262 described in FIG. 2 and in accordance with the portals and methods described in the description of this aspect of FIG. 2. The resulting identification and authentication techniques result in a dynamic process in which authentication may vary time over time, based on the composite result of service rules, deviation from user behavioral norms and user customized policies.

If transparent authentication can not be accomplished or if one or more of the behavioral norms is violated, or as a condition of policy further validation of the user is required, additional steps can be presented to the user. An example of when and how these steps might occur is when a known user on an unknown user machine 202 is presented to the secure service environment 200. In this case the secure service environment 200 will lack the historical information to authenticate/identify the user. In this event, other methods can be used depending on the circumstances. In the event that the user is known, via factors supplied to the web authentication service 205, but the user's machine 202 is unknown or not considered "trusted", where trusted refers to a previous configuration setting performed either by the secure service environment 200 or the user themselves instructing the secure service environment 200 to trust this machine, thereby enabling login using standard authentication methods without additional validation due to hardware or configuration changes, the secure service environment 200 can use out-of-band communications 332 to validate the user. Such out-of-band communication techniques include sending a text message to the user's registered mobile phone. The text message would deliver a randomly generated code for the user to enter into the web authentication server 205 via their local browser 202*a* to "validate" himself or herself. Another out-of-band approach 332 would be to place a phone call to a phone number registered by the user, and then similarly provide a randomly generated code for the user to enter into the web authentication server 205 via the local browser 202*a*. A third out-of-band technique 332 would be to use a smart phone application or "app." The smart phone app will be something the user can use to log in, register with the secure service environment 200, and/or validate himself or herself. As with regular client PCs, smart phones have hardware and/or firmware and/or location identifiers that specifically identify the equipment (phone), and those identifiers can be initially or further stored in the user database 317 for the purpose of user identification.

If most factors are correct but a few are not, the user could still be identified as "correct" if enough factors are found to establish a "confidence interval" around the attempted access. By using such a "confidence interval," the authentication process is flexible and dynamic. Thus, updated hardware that is associated with an authenticated user access could be updated into the user database 317. Thus, the secure service environment 200 can keep a collection of profiles for each user, such as a profile of the machine they accessed the service from, a profile of the browser they accessed from, which machines those browsers were associated with when they connected, what location they are connecting from, if their mobile phone location is consistent with their machine location, how many times they have failed authentication in this session prior to success, etc. The secure service environment 200 can accordingly maintain a history of these items and further analyze historical changes.

The historical changes tracked by the secure service environment 200 can be used to set an expected range of the types and frequency of changes associated with and expected from a given user. Thus, the probability that a given change is correctly associated with a given user can be determined relative to that user's historical norms and thereby can be used to help determine the confidence interval around a user's authentication session. Further, the tracking of such changes and the flexible departure from a rigid authentication scheme allows the presently described system to track changes and to accordingly allow the associated systems to change and for the adaptable authentication system to evolve with such change. If significant changes occur, the secure service environment 200 may allow the change without a separate non-transparent authentication step, but in either case, once the user is authenticated, the secure service environment 200 operates to update components of the secure user data store 212 to reflect the change.

There is a separate but related process for continuing to apply strong authentication to the user. The above description relates to the process of authentication as could be implemented to facilitate login to the secure service environment 200. But even if a malicious user should manage to get past a first level of authentication, such as by gaining access to an actual user's machine and knowing sufficient identification information for that user, certain behavior patterns may trigger an additional verification step. For example, if the system recognizes that a user typically accesses their online financial service account after 5 pm on weekdays, typically to review balances and to pay selected bills, but the secure service environment 200 recognizes activity that is anomalous to this typical behavior pattern, such as a large wire transfer, the secure service environment 200 could interrupt that transaction and prompt the user for an additional verification step.

Once the user has successfully completed the initial transparent authentication process 208, and in the event of an out-of-band 332 additional validation step that has been successfully completed, a more formal interactive user authentication 210 process is initiated. This interactive user authentication process 210 is performed within the secure confines of the secure disposable browser, 226, and is designed to provide the user the capability to authenticate themselves, by inputting their specific authentication string into the prompts provided. The process for starting the local environment that will be used to interact with the secure disposable browser 226, called the "thin client process 202b", and the act of ensuring that the data handoff from the user's local browser 202a to the thin client process 202b is secure, correct and complete, are described below. After successful completion of the transparent authentication process 208, the thin client process 202b that provides a secure connection to the secure service environment 200 is launched on the user's local machine 202. The software code operating as the thin client process 202b or another application running on the user's local machine including a Java applet or other operational code can initiate the thin client process 202b and determine if the client software is up-to-date, if components have been removed or altered, or if the client application has been compromised, or if there is anything else that needs to be installed or replaced. Next, the thin client process 202b or another application running on the user's local machine can create an authenticated session file 350 on the user user's local machine 202. In parallel, within the secure service environment 200, and within the session database 320, the user's session has been profiled, and a set of instructions on connecting from the thin client process 202b to the secure service environment 200, has been defined. This data is passed securely to the user's local machine and constitutes the bulk of the contents of the session file 350. This session file 350 contains data instructing the thin client process 202b on which authenticated service machine 220 to connect to in order to access their secure disposable browser. Connection information on where to connect may include which service infrastructure to connect to in which region, which machine ID will be acting as the authenticated service machine 220, which session ID to present in order to connect to the appropriate session process, which supplemental authentication factors to present, and more.

The session database 320 is referenced by the authenticated service machine 220. The authenticated service machine 220 acts as the system which will instantiate the secure disposable browser 226 for user within a secure jail 214. The thin client process 202b connects to the authenticated service machine 220, and the secure service environment 200 can, through this connection, present interactive authentication 210 for the user, displayed via the thin client process 202b but staged and computed within the secure disposable browser or other secure web container 226 within the service environment 200. The connection established from the thin client process 202b to the secure service environment 200 is an encrypted secure connection. The secure connection can be through a secure socket layer (SSL) connection or other secure communications protocol, and the thin client process 202b can provide client certifications, although the client certification process can be transparent to the user because it can be installed as a part of the software delivered in order to initiate the thin client process 202b. Through this secure communication channel, there are several layers of communication/handshaking. The basic "hello" handshake is the first level, followed by a security level handshake. The secure service environment 200 can further do a security check of the thin client process 202b, or the thin client process 202b itself can run a self-certification on its own initiative or at the direction of the secure service environment 200. In fact, although the thin client process 202b is described at times herein as being separate from the secure service environment 200, it can alternatively be thought of as a part of the secure service environment 200, since it is a system element distributed as a part of the overall secure service environment 200. With this model, as well as with the additional abstractions layered in to each authentication module, as described below, the act of logging on to the service is significantly more secure than alternate systems.

In establishing the connection between the thin client process 202b and the secure disposable browser 226, the authenticated service machine 220 may access the session database 320 to ensure that a valid session request is being made. Once the validity of the session request is established, the authenticated service machine 220 will query the thin client process 202b for additional authentication factors. Once the validity of the additional factors is established, the authenticated service machine 220 will connect to the user database 317 and collect certain user profile information as pre-configuration data for setting up the secure web container or secure disposable browser 226. Once the configuration information is collected, a secure jail 214 or secure private working environment is established within an authenticated service machine 220. That secure jail 214 is instantiated individually for each session and can be terminated (and all associated data deleted) when its associated session is ended. These secure jails 214 provide a mechanism by which a new disposable browser 226 can be created for each user session and populated with the users' configuration data, and whereby such disposable browser 226 can operate on the authenticated service machine 220, secure from the vulnerabilities of typical user machine-resident web browsers.

As a part of the system configuration, the authenticated service machine 220 establishes a queue of pre-built secure jails 214 that are fresh. When assigning these jails 214, such information is established in the jails and the jails are ready to be populated by the secure disposable browser 226, complete with user-specific or other session-specific information such as what authorization schemes the user has, what backend service providers are relevant to the user, assigning relevant data to user authentication schemes, etc. On a given authenticated service machine 220, there can be many secure jails 214 each with a secure disposable browser or other secure web container 226 per physical machine. As with multiple of the described machines in this specification, including the web authentication server 205 and the authenticated service machine 220, these machines can be implemented in a virtual computing environment ("cloud computing"), such as one provided by using Amazon's Elastic Cloud ("EC2") computing environment. Thus, rather than having a user-to-virtual-machine linkage, this described embodiment comprises a user-to-jail linkage, with multiple jails being assignable to each authenticated service machine 220. Further, a variety of virtual computing environments may be available in various geographic locations, across differing vendors, and the authenticated session file 350 that is delivered to the thin client process 202*b* may have specific instructions that allow the thin client process 202*b* to connect to an optimized authenticated service machine 220, that is best suited for the conditions of the user's particular session, e.g., on that is the nearest proximity to the user, on specified network infrastructure, configured with the appropriate user-specific resources, etc.

Security is provided in the secure jail 214 by establishing a secure chroot environment, or similar type of system access control, in which a user's secure disposable browser 226 is restricted to a certain directory within the overall file system on the authenticated service machine 220. For each session, a new session ID is established for the user and is used as the identifier to establish the secure jail directory structure. The secure jail 214, associated directory and data, and secure disposable browser is disposed of after the session is complete. Thus, each user will only see a set of data that is germane to them and has been established for their current authenticated sessions. The authenticated service machine 220 has a queue of such pre-configured secure jails 214 available, and is accordingly able to assign them to users upon each session request to establish a session-specific secure jail 214, and can then create the secure disposable browser 226 within the secure jail 214 and add the user's preferences to it.

To ensure the segregation and security of the data in these jails, permissions are established as described above such that one user's data is not accessible to another user and that one disposable browser or other secure web container 226 cannot be compromised and be used to intercept or corrupt another user's disposable browser or other secure web container 226 operating in another secure jail 214 running on the same authenticated service machine 220. Further, the implementation can include independent encryption of each user's data.

To provide the element of "disposability," these secure jails are deleted at the end of each user session, and thus the ending of a secure disposable browser 226 session also results in the clearing of user data and applications associated with that browser session. Thus, although the secure user data store 212 may retain the user session settings, no such settings are stored on the user's local machine 202. Further, since the user is interacting with the secure disposable browser 226 using the thin client process 202*b* through a secure access channel 204, using a protocol that is restricted to display and user input data, the downstream websites 253 that the user is interacting with are not readily able to track user actions and user behavior. The user is controlling the secure disposable browser 226 remotely, and any cookie data, source IP data or other user identifiable factors, outside of any login credentials that may have been supplied as part of the access to the site, is obscured to the downstream website. Given that all cookie data may be destroyed at the termination of the session, and given that the user may reconnect to another secure disposable browser that would have a different source IP address, the downstream websites will only be able to track single-session behavior from a non-attributable source IP address. Accordingly, from a security standpoint and from a user privacy and data-tracking standpoint, the implementation of a disposable browser shields users from undesired consequences. According to policies stored in the policy database 262 (see FIG. 2), various aspects of the user browser session can be stored and retained, even including the specific browser session states if desired, but they are safely encrypted and stored within the secure user data store 212.

Certain session information can be stored in the session database 320 and the user database 317 allowing the user to maintain session status, even when disconnecting and reconnecting at a later time. Depending on configuration and applicable polices as defined in the policy database 262, a user could disconnect the thin client process 202*b* from the authenticated service machine 220, but the associated jail 214 and disposable browser 226 could remain in situ. A user could re-authenticate and present the original session ID or other identifier, and start the thin client process 202*b* again from the same machine, or from another local user machine 202 or alternate type of device, such as a smart phone or a tablet computer (not shown) and re-connect to the same authenticated service machine 220, secure jail 214 and disposable browser 226. This would provide continuity to the user, allowing them to move from machine to machine, without having to re-connect to any downstream sites when reconnecting to a secure disposable browser 226.

Figure 4:
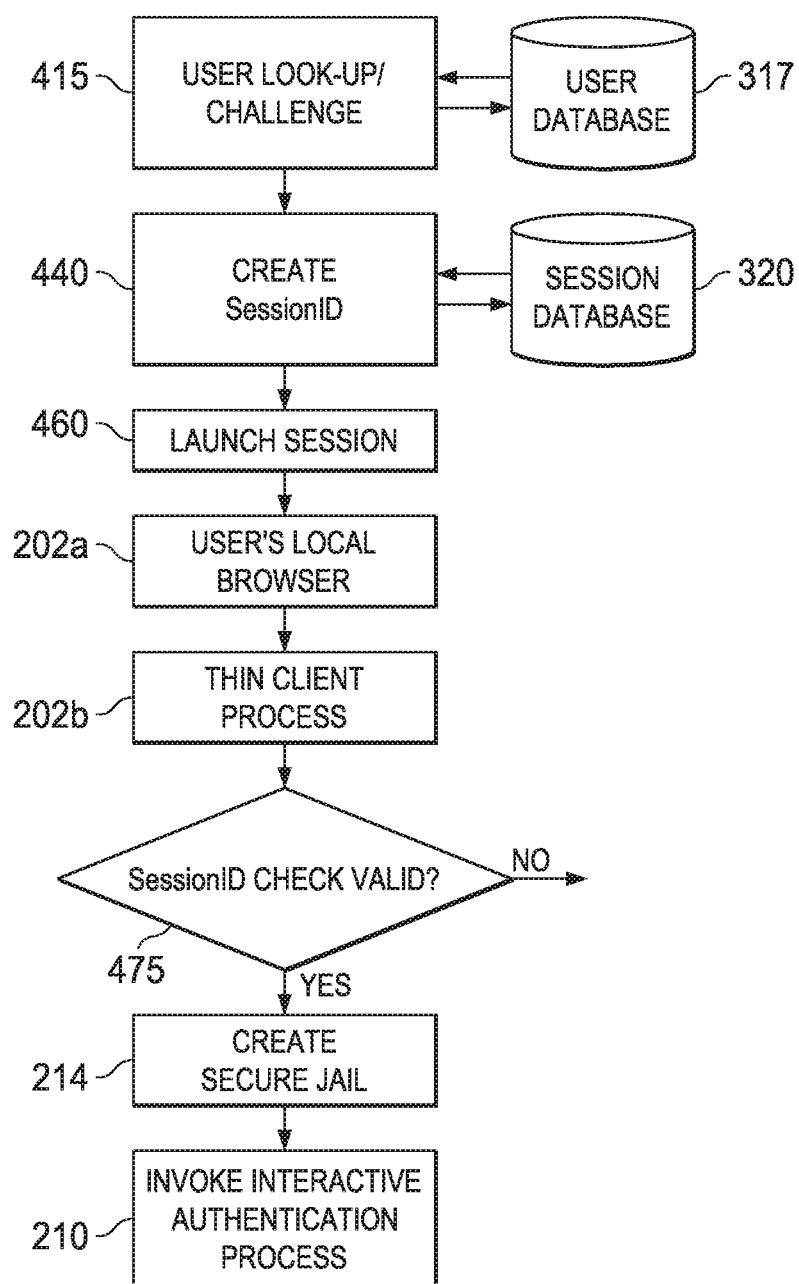
FIG. 4 illustrates a flow diagram for the authentication of a user to the secure service environment described in FIGS. 2 and 3 and the establishment of a secure session between them, in accordance with the present disclosure.

The program flow of the user interaction and authentication process is illustrated in FIG. 4. After transparent authentication factors are collected and validated, the authentication process transitions from an initial process conduced via HTTPS to a more formal process, where an authentication application (the interactive authentication process 210) is presented to the user within the secure disposable browser 226. The initiation of the formal authentication process begins with the launch of the thin client process 202*b*, and is illustrated in the figure in which the user's local browser 202*a* sends account data, such as a user nickname 415, in which a look-up of the account information is performed against user database 317. In response to the look-up, a User ID is returned, and a Session ID is created and associated with the User ID at action 440. In particular at action 440, the User ID is sent to the session database 320, where the session database performs checks, and returns a Session ID. Then, having assigned a Session ID in the session database 320 and associated that Session ID with the User ID, the session connecting the secure service environment 200 can be launched, and rendered by the thin client process 202*b*. This transition from an initial connection and query via HTTPS by the web authentication server 205 for performing transparent authentication 208, to remote display of the secure disposable browser 226 via the thin client process 202*b* via the secure access channel 204 is significantly different from other solutions and provides a comprehensive and secure environment for exchanging authentication credentials and interacting with downstream web sites 253.

In the described embodiments above, the initial web browser challenge 415 can be sent unencrypted or unencrypted. In processing the user look-up action, the data created or identified as a part of the above-described process includes a User ID and an associated Session ID that are created at that time (action 440). The User ID is looked up before its linking to a new Session ID, which is initially merely a new record in the session table in the session database 320.

The session database 320 may be kept unencrypted, but the User IDs used for each session are transmitted with encryption, and the User IDs are thus preserved encrypted in the back end of the secure system 200 to protect them from disclosure on the general internet. The motivation to provide this selected encryption is that it removes the incentive to try to "crack" a particular database. Thus, even if a hacker were to "crack" one database, without the other cross-referenced database access, the hacker would not be able to tell what the "cracked" data relates to. Further, each user with each provider has a different encryption key, even further limiting the scope of what could be learned by "cracking" a database.

As a part of the launch session (action 460), the Session ID is sent to the user's local browser 202a, which then starts up the thin client process 202b. Referring back to FIG. 3, there is a handoff between the user's local browser 202a and the thin client process 202b where more formal authentication activities can occur. Thus, the original user's local browser 202a authentication process only connects to the web authentication server 205, which only accesses the user database 317 and the session database 320, but nothing related to more formal user authentication or account information.

The authenticated service machine 220 is operable to validate the session ID sent to it by the thin client process 202b. In this instance, the authenticated service machine 220 connects to the session database 320 to verify the validity of the session ID received from the thin client process 202b. The validity of the session ID is determined by making an inquiry to session database 320 regarding whether the session ID currently exists and is not expired. Once the session ID is validated at action 475, the authenticated service machine 220 creates a secure jail 214 and launches the interactive authentication process 210. In other words, the foregoing steps were all directed to identification of the user—the transparent authorization process 208 identified in FIG. 2—but the interactive authentication process 210 has not yet strongly authenticated the user to fully access the secure disposable browser or other secure web container 226.

Figure 5A:
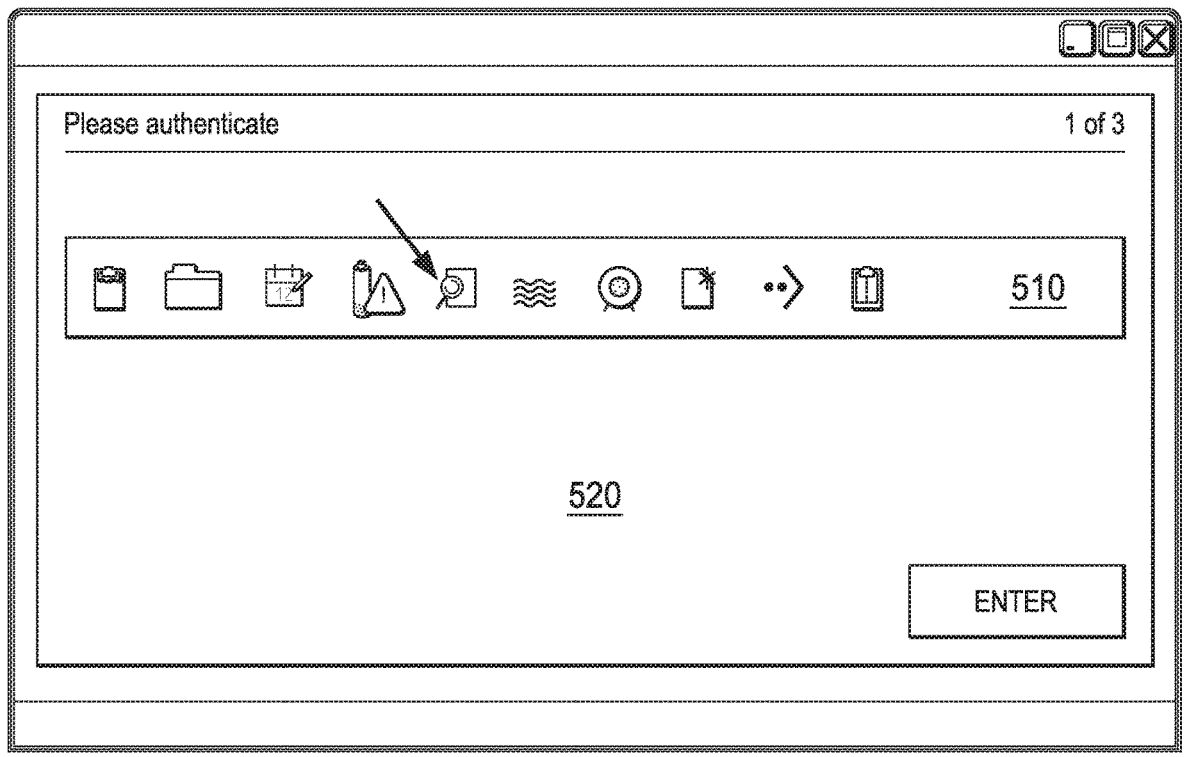
FIGS. 5A-5C provide exemplary authentication screens whereby a user can be explicitly authenticated with the secure service environment described in FIGS. 2, 3, and 4, in accordance with the present disclosure.
Figure 5B:
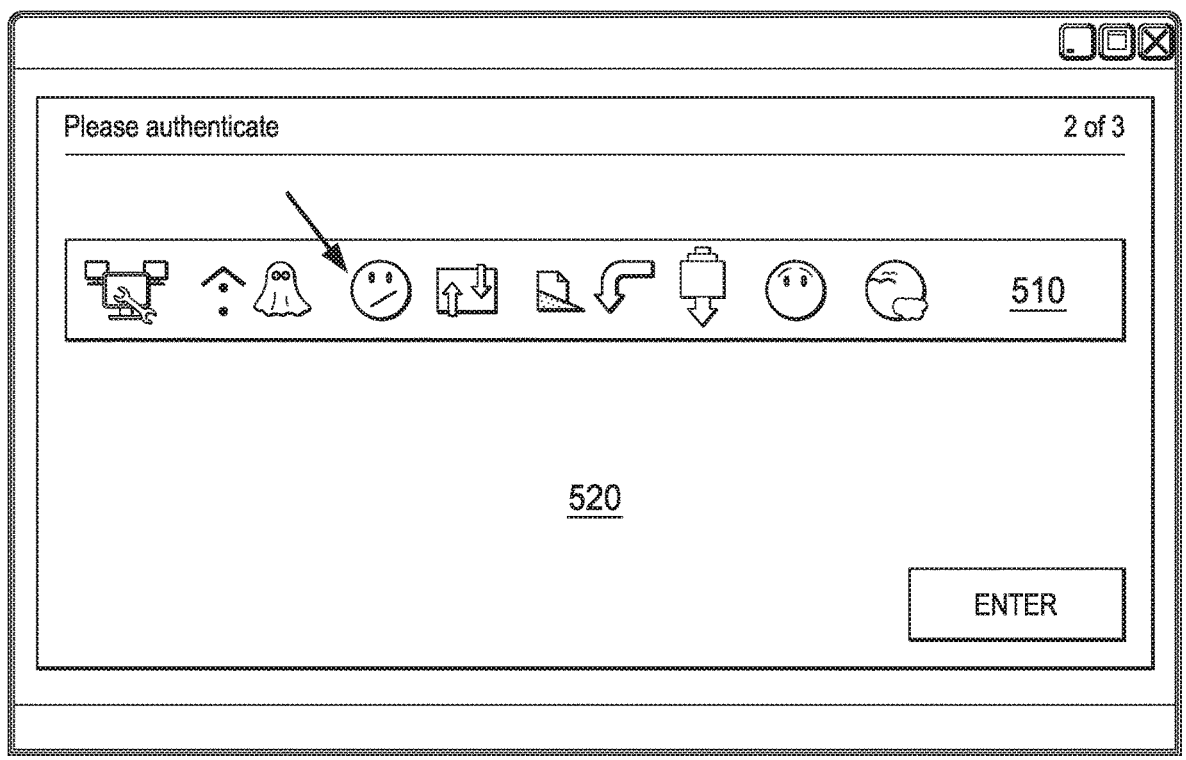
Figure 5C:
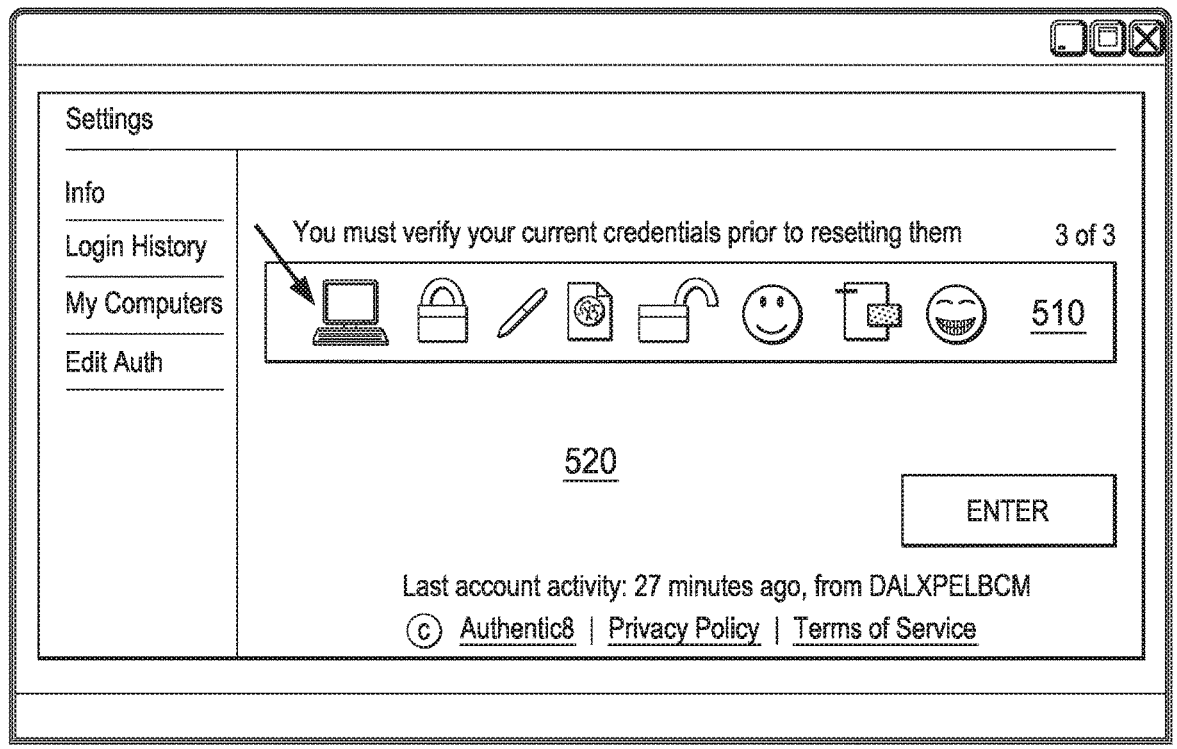

FIGS. 5A-5C illustrate a user interface for interactive authentication 210. This interactive authentication process comprises the user interacting with the launched but not yet authenticated secure disposable browser 226 within the secure jail 214 contained within the authenticated service machine 220. The secure disposable browser appears as a standard web browser to the user, but rather than being software operating on the user's local machine 202, it is an application that is running on the authenticated service machine 220 within a secure jail 214 at the secure service environment 200.

The interactive authentication process 210 will be further described below, but it could be comprised of any human interface presently known or developed in the future for providing interaction between a computer and a human—visual webpage cues, keyboard or mouse input, audio cues and/or voice recognition input and supplemented with delivery of out-of-band data (e.g. via the user's mobile phone) to strengthen the authentication of the end user. The interactive authentication process 210 may be more or less involved depending on the confidence interval placed on the user's authenticity from the preceding transparent authentication process 208.

The interactive authentication process 210 also makes the assumption that inputting authentication data directly into the user's local machine 202 can lead to compromise. As a result, the interactive authentication process 210 only requires the user to input a randomly assigned and constantly changing representation of their authentication data into the user's local machine 202. This reduces the possibility that stolen system input data has long-term value since it does not correspond to the user's actual authentication data. Various applicable techniques that could be implemented within the context of the preceding figures, including FIG. 5, are described below.

For the exemplary interactive authentication process of FIGS. 5A-5C, during initial registration to the service the user establishes a sequence of at least three random icons from a library of icons. This selected sequence of icons represents the user's interactive authentication sequence from thereon. Whenever subsequently authenticating to the secure service environment 200, the user will be presented with the interactive authentication process 210 within the secure disposable browser 226. In this process the user will be required to select (using a mouse click) the correct icons in the correct sequence from a randomly displayed subset of icons. The subset of icons displayed and the relative positioning of the user's specific icons will change randomly each time the interactive authentication process 210 is delivered. The arrow in FIG. 5A points to the first one of the sequential random icons that can be selected by a user click, whereas the arrows in FIGS. 5B and 5C point to the second and third selected icons respectively. As can be seen from the figures, these chosen icons are presented as authentication images 510 in the interactive authentication screen display 520. This method satisfies the "something you know" criterion of multi-factor authentication since it requires the user to recall specific knowledge to demonstrate authenticity.

Another type of interactive authentication process 210 would require the user to establish an x-digit PIN during registration to the service. This represents the user's interactive authentication data from thereon. Whenever subsequently authenticating to the secure service environment 200, the user will be presented with a 0-9 number line, with each number being randomly assigned or mapped to a single or double set of letters. (E.g., O=k, 1=ef, 2=t, 3=xc etc.) The user then uses the keyboard to input the letters corresponding to the digits of his or her PIN. Furthermore, each time user enters a letter(s), the random mapping of numbers to letters changes. In this way, the system input data is never the same and the user's PIN is never directly revealed. This method satisfies the "something you know" criterion of multi-factor authentication since it requires the user to recall specific knowledge to demonstrate authenticity.

Another type of interactive authentication 210 would be to use phone-call-based authentication. The purpose of phone-call based authentication is to associate or bind a purported user's authentication session to the secure service environment 200 with a phone known to be owned by that purported user, thereby increasing the confidence that the purported user is legitimate before granting full access to the secure service environment 200. At initiation of the service, users could designate a set of phone numbers (cell, home, etc.) with the secure service environment 200. An authenticating phone call could then happen at any time during the transparent authentication or interactive authentication processes 208, 210 based on environment variables and/or user-defined policies. A recorded greeting played for the user could be made in the user's voice to provide comfort on the authenticity of the calling party. Answering this call and entering either a pre-defined key, PIN or password would accordingly authenticate the user. If successful, the user would then return to the web session where the authentication process will proceed automatically. This method satisfies the "something you have" criterion of multi-factor authentication since it requires the user to have possession of an identifiable item to demonstrate authenticity (namely the phone).

The above two techniques may be used in isolation or together depending on the situation and/or the confidence interval placed around the transparent authentication process 208. Phone-call based authentication may also be conditionally added in the scenario where there is no other "something you have" factor present (like a certificate on the user's local machine 202). This would reflect the scenario where a registered user is attempting to access the secure service environment 200 from a new or untrusted local machine.

As described in FIG. 3 regarding out-of-band communications 332, variants of phone-call based authentication techniques in the disclosed systems and methods include: (a) delivery via text of a one-time code to the mobile phone that the user is required to enter into the authentication process 208, 210; (b) delivery via a phone call of a one-time code that a user is required to enter into the authentication process 208, 210 (c) generation of a one-time code on the smartphone (using a dedicated application) that the user is required to enter into the authentication process 208, 210; (c) using a dedicated application on the smartphone to store/access a unique "authentication grid", comprised of random numbers arrayed by column and row and asking the user to enter a random combination into the web session (e.g., BS, K1, C3=2, 5, 8). This grid can be static, or it can dynamically refresh based on some algorithm.

Outside of the systems and methods described above, additional "something you know" mechanisms are disclosed in the embodiments herein. These additional "something you know" techniques include but are not limited to other image-based methods including:

Asking users to select images from pre-selected categories from among an array of other random pictures—example categories include planes, flowers, and people.

Asking users to select pre-determined items/regions within an image—examples are the rudder on sailboat, a third seagull from the left in a flock, the right shoe on a man, etc.

Asking users to draw a predefined image using their mouse within a N-box grid, which essentially operates like a digital signature.

Asking users to pair pictures based on some pre-defined association between specific picture or categories—examples are couplings of beds<=>boats, planes<=>castles.

Another authentication technique that could be used includes gaming concepts, specifically including using knowledge of how a user chooses to play a game as an authentication technique. As an illustrative example, it could be learned how a user moves a "Pac Man"-type character through a course or how the user plays tic-tac-toe. The games themselves could be representations of various well-known games, and they could be presented as represented in FIG. 5 as images or protocols 510 on the screen 520.

Another authentication technique that could be used at this stage includes capturing user gestures using various input devices. An example would be moving an accelerometer enabled device in x/y/z space and using the accelerometer to capture the motion, or using the finger/stylus to input a gesture in x/y space on the screen.

Other authentication techniques that could be used at this stage include word games and numerical puzzles. Users could complete pre-selected phrases as an authentication technique, and this would include the ability to craft user-specific shared secrets, phrases/quotes. The secure service environment 200 would supply half of the shared secret and the user would complete it. For numerical puzzles, users could be asked to complete simple pre-defined numerical equations as an authentication technique. Users select or define an equation with the secure service environment 200. The pre-defined equation could contain static and dynamic parameters as well as random inputs, and the user could control the complexity of the equation. A simple exemplary equation would be "(Today's date)×(service provided random #)×(my age)".

The disclosed embodiments include the collation and selective use of the above techniques based on situational context and user preference, including based on an original confidence interval determined from the transparent authentication process 208 as well as enabling user customization of large parts of the process.

As to the user customization of this process, in the disclosed systems users are enabled to customize their choice of interactive authentication process 210 as described above, as well as to customize the situations and rules around when and how these methods are used. Following are exemplary customization methods. Users can select a "something you know" scheme from the list of many provided as well as conditionally complement it with a "something you have" scheme. Users can determine the specific elements of their selected scheme (pictures, equation, PIN, gesture, phrase, call, SMS etc). Users can create default or conditional rules for when different parts of the interactive authentication process 210 is used—examples include—"Always call my phone to authenticate me"; "Send me an SMS when you're unsure of my authenticity"; "Perform out-of-band authentication whenever I'm coming from a new machine, a new location or out of my normal hours"; "Always prompt me for authentication whenever I access www.mybank.com" etc.

Thus far the above schemes for transparent and interactive authentication processes 208, 210 have described methods to authenticate the user attempting to access the secure service environment 200. Described below are methods for the secure service environment 200 to convey its authenticity to an end user. Such methods rely on the notion that certain information about the user and the user's behavior is uniquely known by the secure service environment 200. Displaying this data to the user allows a legitimate user to have greater confidence around the authenticity of the secure service environment 200 while correspondingly increasing the difficulty for a fraudulent service to deceive the user. Examples of such data includes display of user's nickname, history of logins, map of recent login locations, accurate downstream website 253 accounts, browsing history and bookmarks etc. The user can use any or all combinations of these elements to validate the authenticity of the secure service environment 200.

FIG. 6 provides the user screen for the authenticated secure disposable browser 226 within the secure jail 214 contained within the authenticated service machine 220.

This screen is provided once the user has successfully undergone transparent and interactive authentication processes 208, 210, and it shows a user's established accounts. For the established accounts shown here on this screen, the secure service environment 200 has captured and stored user credentials at the user's consent, such that a user can automatically login with one-click to his or her established accounts from any local machine 202 from which the user has accessed the secure service environment 200. The user screen also provides multiple browsing tabs as can be seen at the top, where each tab can present images representing a different downstream website 253 or web page. As previously mentioned, the user's local machine does not receive and process web code as all web code is instead processed within the secure disposable browser or other secure web container 226. The user's local machine 202 is accordingly dislocated from malware or other internet exploits since it is not directly exposed to the public internet. The service provider is also protected in this as it is not directly exposed to potentially compromised user client machines.

Figure 7:
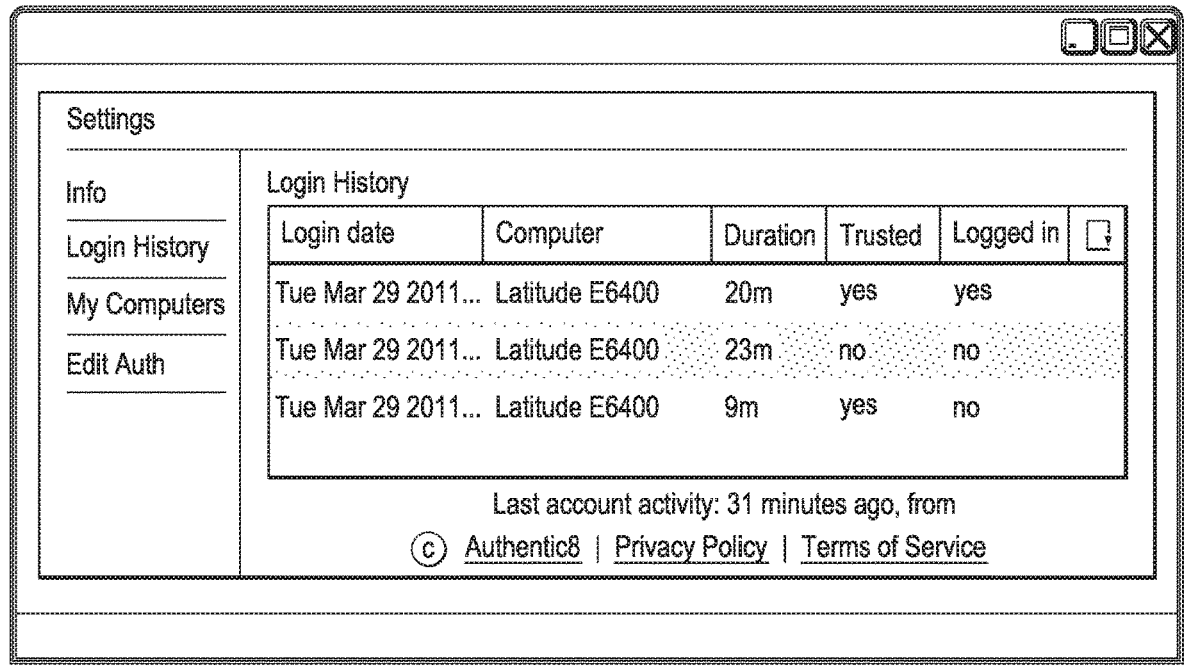
FIG. 7 illustrates a user's history, login names, computer names, durations and other relevant status histories for their access to the secure service environment described in FIGS. 2, 3, and 4, in accordance with the present disclosure.
Figure 8:
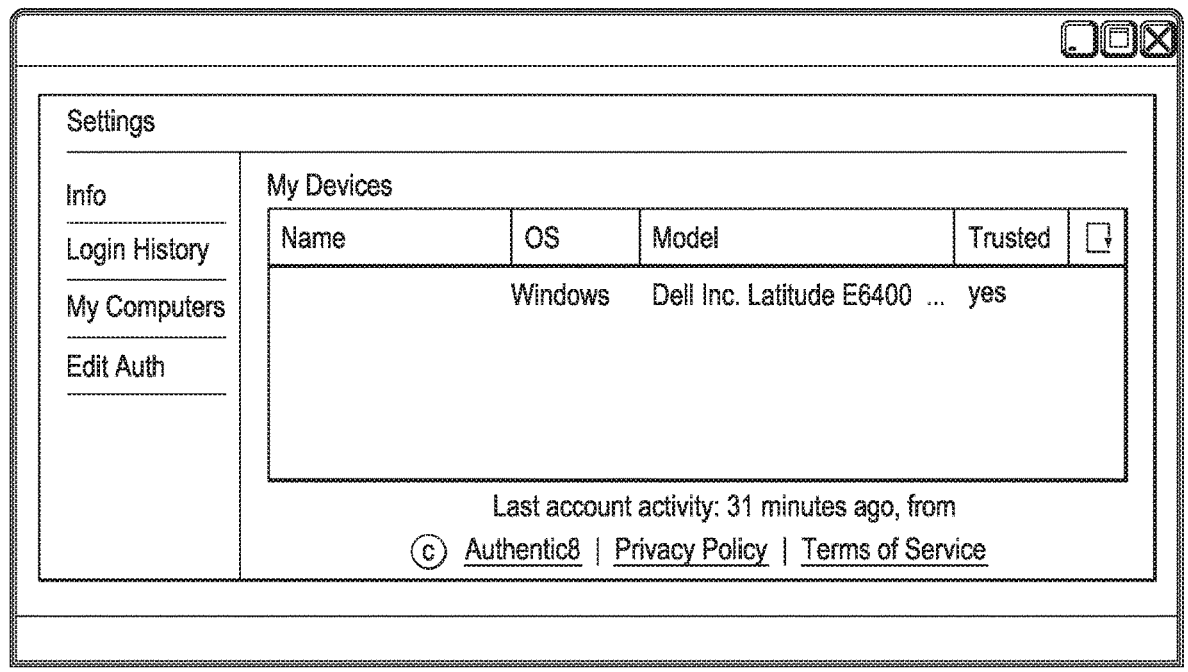
FIG. 8 illustrates a listing of a user's devices that the user has used to access the secure service environment described in FIGS. 2, 3, and 4 and the state of the system's "trust" with respect to those devices, in accordance with the present disclosure.

FIGS. 7-8 provide additional screen shots that illustrate a user's login history in terms of login date, identifying name of local machine, duration of the session with the secure service environment 200, trusted or untrusted nature of the user's local machine and current active session versus previously active sessions. As demonstrated here, the user can access the secure service environment 200 from any internet-accessible machine. Moreover, the user can then also optionally choose to trust, untrust or delete certain machines that they have used to access the secure service environment 200. The consequence of trusting or untrusting a machine determines the incremental steps and sequencing required during the transparent and interactive authentication processes 208, 210 when accessing the secure service environment 200. For example, when accessing the service from an untrusted, deleted or previously never used machine, the secure service environment 200 will perform out-of-band authentication during the transparent authentication process 208, and also prompt for the interactive authentication process 210 immediately upon accessing the secure disposable browser or other secure web container 226. In contrast, when accessing the secure service environment 200 from a trusted machine, the user may bypass out-of-band authentication altogether and only be required to perform interactive authentication 210 within the secure disposable browser or other secure web container 226 when attempting to access or modify user data.

Description of Specific API Web Container Environment

Figure 9:
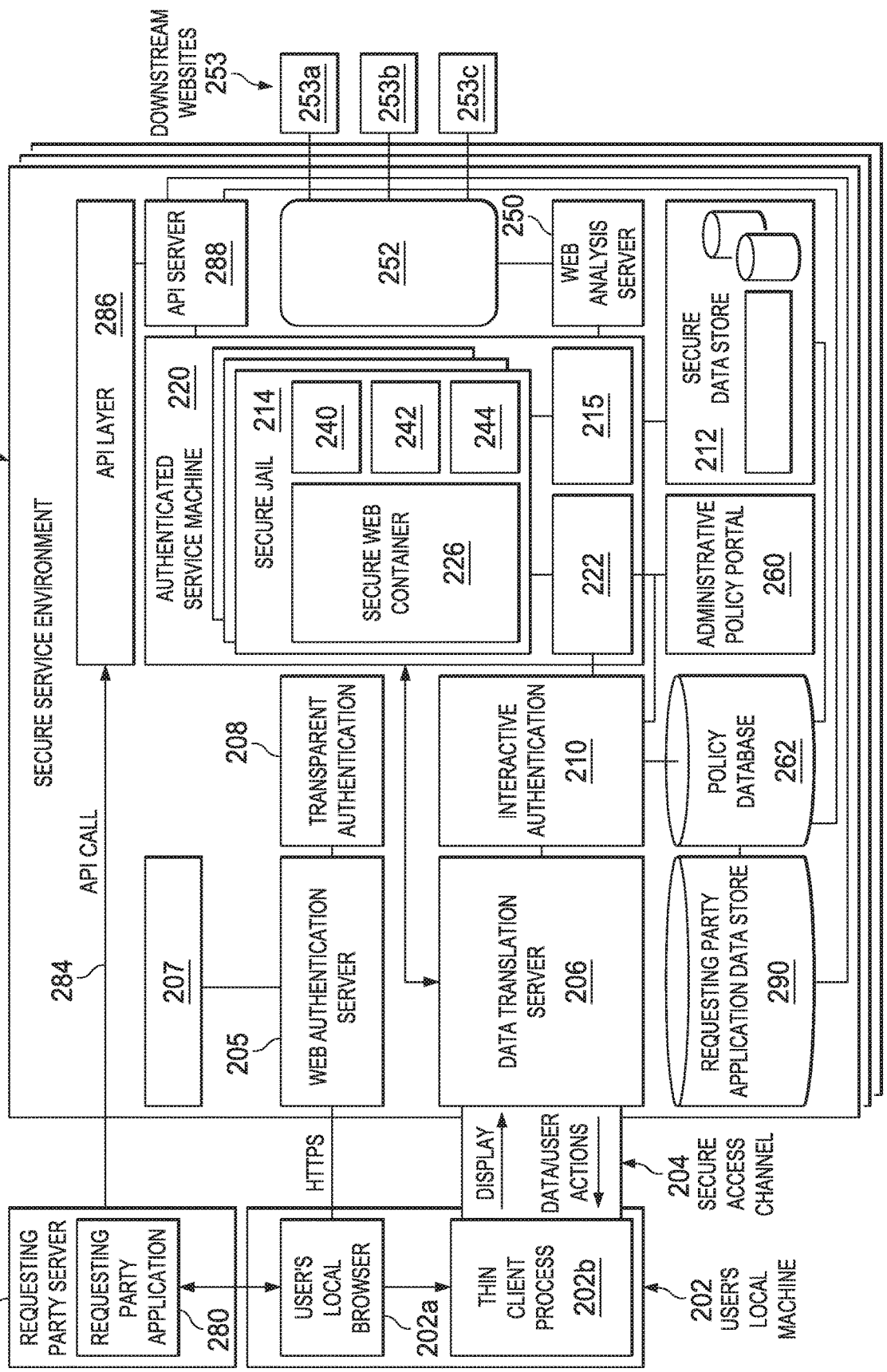
FIG. 9 illustrates a high-level service architecture for providing a secure web container within a secure web container service environment through an API call, in accordance with the present disclosure.

FIG. 9 illustrates a secure web container service environment embodiment of the secure service environment 200 of FIG. 2. In general, the secure web container service environment embodiment discloses a "push" model, as opposed to a "pull" model where a user initiates the service. In this embodiment, a website owner asks the secure service environment 200 to contain its content in the secure browser and deliver it to the user via the disclosed "push" model using API calls 284. When a user clicks on a link or accesses a webpage via his or her local browser 202*a*, the website owner passes an API call 284 to the secure service environment 200. The secure service environment 200 instantiates the browser rendering framework, populates it with page data (or empty), and pushes the display to the user. From the user's perspective, the user sees another window or a tab, and does not go through any other connection process.

The secure service environment 200 may include various machines, servers, and processes as discussed above in relation to FIG. 2. Thus, the secure service environment 200 may include, for example, web authentication server 205, data translation server 206, transparent authentication process 208, interactive authentication process 210, secure user data store 212, secure jail 214, authenticated service machine 220, web analysis server 250, downstream web server analysis process 252, admin policy portal 260, and policy database 262. The secure service environment 200 may also include an application programming interface ("API") layer 286 in communication with a requesting party server 282 and further in communication with an API server 288. The API server 288 is in communication with the authenticated service machine 220 and policy database 262. The secure service environment 200 may also include a secure web container 226 within a per-user secure jail 214 in the authenticated service machine 220. The policy database memory 262 may include a plurality of policies which may be used with a plurality of requesting party application providers based on the syntax of the APL.

The API server 288 is operable to validate an API call 284 received from a requesting party application 280 of a requesting party application provider. Requesting party applications 280 are on a requesting party server 282 which operates remotely from the user's local machine 202. Depending on the situation, the requesting party server 282 may operate remotely or locally with respect to the secure service environment 200. For example, in an embodiment, the requesting party server 282 is a remote server in communication with the service environment 200. In another embodiment, the requesting party server 282 is a local server connected via a local network (e.g., LAN, WAN, etc.) with the secure service environment 200.

Requesting party applications 280 may comprise online services. The requesting party server 282 is in communication with the user's local machine 202 and the API layer 286 in the secure service environment 200. Upon validation of the API call 284, a secure web container 226 is constructed within the secure service environment 200, which is operated securely and remotely from the user's (potentially compromised) local machine 202. Thus, the secure web container 226 is invoked to effect displaying images representative of requesting party application web content at the user's local machine 220 based on the API call 282. The images representative of the requesting party application web content is translated using a network and application protocol and delivered (via data translation server 206) to the end user's local machine 202 as encrypted data over a secure access channel 204. The thin client process 202*b* on the end user's local machine 202 decrypts and renders this data to the user as an image of the secure web container running within the secure service environment 200.

The secure web container 226 may be invoked based on the triggering of one or more triggers defined within the requesting party application 280. The triggers may automatically cause the requesting party application to make an API call 284 to the API layer 286 of the secure service environment 200. It should be appreciated that the requesting party can invoke requests from contexts other than online services or websites. It could be any application or service that would call the API to deliver secure web content, such as a local email application, a user support or ticketing system, or any of a number of other applications that might invoke a need for secure user interaction.

To invoke the secure web container 226 based on the API call 284, an API server 288 is in communication with the API layer 286, the policy database 262, and the authenticated service machine 220. The API server 288 validates and processes the API call 284. In some embodiments, the API server 288 instructs the authenticated service machine 220 to construct a generic secure web container. In other embodiments, the API server 288 instructs the authenticated service machine 220 to construct a secure web container based on policy records in the requesting party application data store and/or policies in the policy database 262. In an embodiment, the API server 288 may determine which policy is associated with which requesting party application via looking up the requesting party's policy record(s) in the policy database 262. The server may further instruct the authenticated service machine 220 to invoke the secure web container 226 based on the policy record(s) determined from the policy database 262. To effect the invocation, the API server 288 determines which policy or policies from the policy database 262 are associated with the requesting party's policy record(s) and instructs the authenticated service machine 220 to use relevant policies for the secure web container 226. The authenticated service machine 220 is in communication with the policy database 262 and may retrieve the relevant policy or policies from the policy database 262 when invoking the secure web container 226.

The secure web container 226 may be a disposable web browser. The disposable web browser may be provided to display within an existing browser window at the user's local machine 202 as an additional tab of the existing browser window at the user's local machine 202, as a sub-window associated with the existing browser at the user's local machine 202, or as a separate system window at the user's local machine 202.

Still referring to FIG. 9, a policy record associated with the requesting party application 280 may be determined at the API server 288. In this embodiment, the requesting party application data store 290 in communication with the API server 288 and the policy database 262 effect determining the policy record associated with the requesting party application 280. The policy record may also be received from the requesting party application 280 substantially simultaneously with the API call 284. Thus, the API call 284 may define a policy or a policy record in several ways. The requesting party application data store 290 may also include policy attributes which govern aspects of user-interaction with the web content. One or more of the policy attributes may be associated with one or more of the plurality of policy records in the policy database 262. Policy attributes may also be received from the requesting party application 280 simultaneously with the API call 284. Thus, the API call 284 may also define policy attributes in several ways.

To allow administrators to set policies for a plurality of requesting party application providers, a policy portal server may be connected to the policy database memory 262. An administrator may be one of the plurality of requesting party application providers, which would enable the administrator the provide its own policy record. Additionally, an administrator may set policy records on behalf of the plurality of requesting party application providers.

Figure 10:
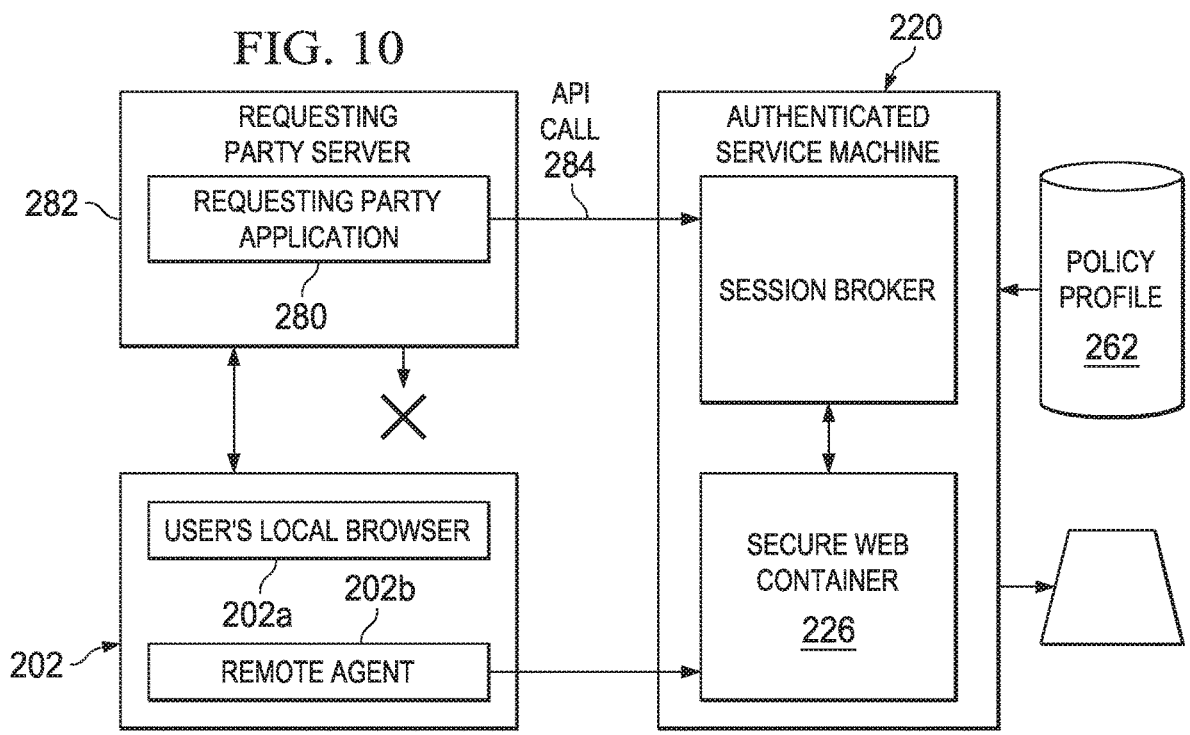
FIG. 10 illustrates a system for establishing a secure web container session m communication with a user's local machine, in accordance with the present disclosure.

Illustrated in FIG. 10 is a functional-level view of the secure service environment 200 of FIG. 9. This figure illustrates the interaction between some of the system elements described in FIG. 9. While there are certain elements shown in FIG. 9 that are not illustrated in FIG. 10 and vice versa, one of ordinary skill in the art would be able to advantageously describe with respect to one figure in order to achieve the advantages described herein for operation with the embodiment shown in other figures. All such embodiments are understood by one of ordinary skill in the art to be encompassed within the present specification.

The disposable web container API allows any web service or other application (defined as the requesting party) to programmatically invoke a secure web container for displaying web content. The requesting party will develop against the API to integrate triggers into their application that spawns the disposable browser. These triggers can be defined by the requesting party and contained within their application logic. The API exposes a basic syntax for making a call to the disposable web container service when a trigger has been invoked. The display of the content and the controls in place to govern user interaction with the content or ability to access third party web content using the disposable browser can be pre-defined and stored within the disposable web container service or delivered as party of the syntax of invoking the disposable browser. Users may have no prior knowledge of these triggers, and can be seamlessly transitioned to the disposable browser at the point of invocation.

Referring to FIG. 10, user interacts on local machine 202*a* natively with requesting party application 280 (via the local browser, if a web service). User invokes a trigger within the application that makes an API call 284 to the secure web container 226 service. Secure web container 226 validates the requesting API call 284 and interprets API syntax, which may include site URL to publish and browser attributes (such as navigation elements to include or suppress, duration of session, and more). Secure web container 226 prepares the policy record associated with the requesting party 280 API call 284 that will govern the user interaction with the disposable browser. This policy record may be included as part of the requesting API call 284 or may be stored within secure web container 226 and fetched at invocation from a secure policy database or policy profile 262. The secure web container 226 is built in a sandbox with specified policy attributes invoked. Policy attributes govern any and all aspects of the user interaction with the content within the secure web container 226, including file up/download capability, external linking/navigation, presence of free-form browser navigation elements and menus, copy/paste capability, session duration and/or termination rules and more. The user is prompted to download/accept remote agent 202*b* (if necessary or if absent), after which user is presented with the secure web container 226 disposable browser from within their existing browser window, as an additional tab within their browser, as a sub-window associated with their browser, as a separate system window, or other. User continues within disposable browser for the remainder of the session, as defined by policy controls. Requesting party 280 updates local browser window with reference to the secure web container 226 disposable browser window or tab. When the session is complete, either via user action or secure web container 226 action, all user browsing data is purged.

Figure 11:
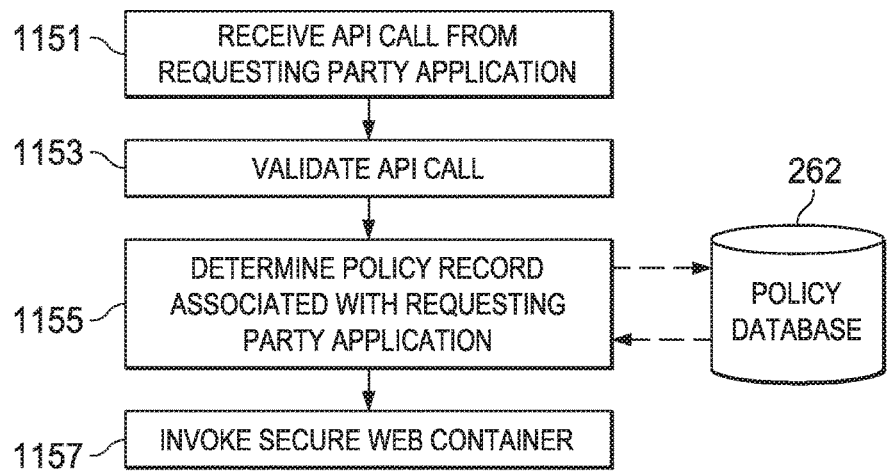
FIG. 11 illustrates a flow diagram for establishing a secure web container service environment described in FIGS. 9 and 10, in accordance with the present disclosure.

FIG. 11 is a flow chart illustrating a method for providing user interaction with requesting party applications in the secure web container service environment 200 described in FIG. 9. The API layer in the secure service environment 200 receives an API call from the requesting party application at action 1151. The API call is validated at action 1153. The policy record(s) associated with the requesting party application are determined at action 1155. As discussed above in relation to FIG. 9, the policy record(s) associated with the requesting party application may be retrieved from the policy database 262. The API layer invokes a secure web container for displaying images representative of the requesting party application web content at the user's local machine based on the API call at action 1157.

Figures 12A, 12B, 12C:
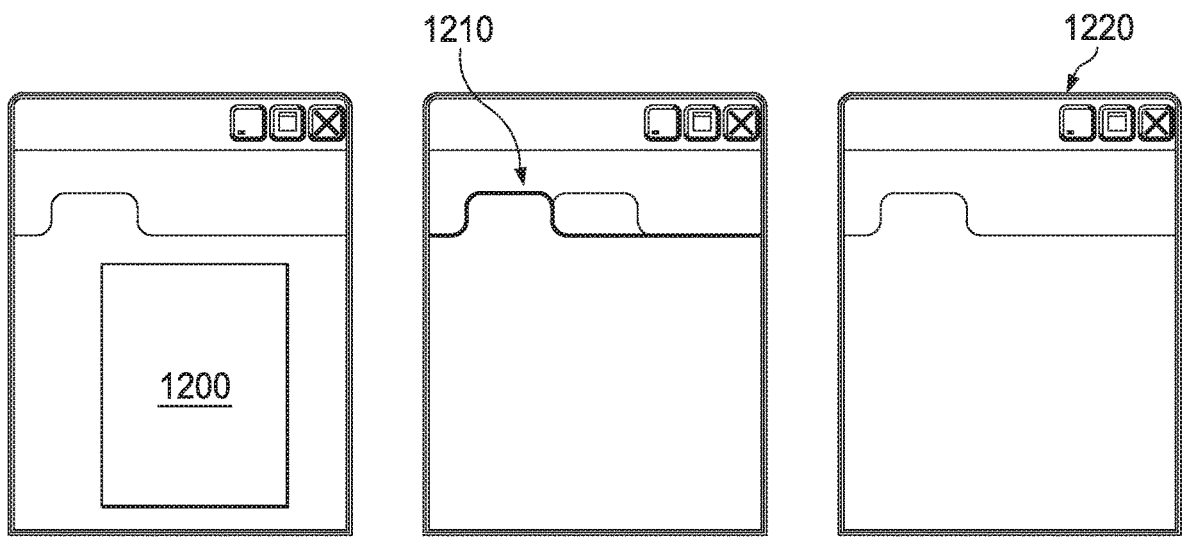
FIGS. 12A-12C illustrate exemplary secure web container service environments described in FIGS. 9, 10, and 11, in accordance with the present disclosure.

FIGS. 12A-12C are schematic diagrams illustrating various embodiments of the secure web container. FIG. 12A shows an embodiment in which a first embodiment of the secure web container 1200 is provided to display within an existing browser window at the user's local machine as a sub-window associated with the existing browser window at the user's local machine. FIG. 12B shows an embodiment in which a second embodiment of the secure web container 1210 is provided to display within an existing browser window at the user's local machine as an additional tab of the existing browser window at the user's local machine. FIG. 12C shows an embodiment in which a third embodiment 1220 of the secure web container is provided to display within an existing browser window at the user's local machine as a separate system window at the user's local machine.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application. Further, there are a number of embodiments for authentication and other features that are described in the context of a "pull" type disposable browser environment, but it should be appreciated that such embodiments are further applicable to API-type "push" embodiments as well according to design needs. Although there are references in particular embodiments to "secure disposable browsers," "secure web containers" and "secure web rendering frameworks," it should be appreciated that depending upon context these terms may be used interchangeably to refer to the presentation of web images to a user in a secure embodiment, and the terminology is used in different contexts according to the end use that is being described at the time. In general, and according to design needs, the described embodiments may all be used in the other end uses or contexts. It should further be appreciated that "API" as used herein refers to any type of coordination between operating instances in different systems communicating with each other. The term "API" is not intended to be limited solely to specific application programming interface calls at the software level.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations. Although various computer elements have been illustrated herein as single computer servers or machines, such elements may operate over several different physical machines, or they may be combined as operating code instances running on a single physical machine. The claims in the present application comprehend such variation in physical machine configurations.

Various computer elements have been illustrated herein as single computer servers or machines, such elements may operate over several different physical machines, or they may be combined as operating code instances running on a single physical machine. The claims in the present application comprehend such variation in physical machine configurations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A secure system for providing a secure online environment for interacting with downstream sites using web-based applications, the system comprising:
   a client device interface comprising a secure channel operable to communicate with a user client device through an image protocol, wherein commands from a downstream site are not passed from the downstream site to the user client device;
   a policy database operable to store policies for user access to and interaction with the downstream site, the policy database comprising policy information;
   a policy portal in communication with the policy database, the policy portal operable to provide access to an administrator for configuring the policies for user access to and interaction with the downstream site;
   an authenticated service device in communication with the client device interface and the policy database, wherein the authenticated service device is operable to access and interact with the downstream site at the user client device and the authenticated service device further comprises a secure environment and a secure web container within the secure environment; and
   a secure data store in communication with the authenticated service device, the secure data store operable to store user credentials for accessing and interacting with the downstream site in accordance with the policies stored in the policy database,
   wherein the authenticated service device is operable to authenticate to the downstream site based on the user credentials, and provide, using the image protocol and via the client device interface, content associated with the downstream site to the user client device, and wherein the user credentials are not transmitted directly from the user client device to the downstream site.

2. The system of claim 1, wherein the policy database further comprises policies stored within the policy database that allow for behavioral rules to define user access to and interaction with the downstream site.

3. The system of claim 1, wherein the user credentials are fetched from within the secure environment, such that automatic downstream site logins are provided without transmitting the user credentials to the user client device.

4. The system of claim 1, further comprising creating a session ID, wherein the session ID is assigned in a session database and wherein the session ID is associated with the user.

5. The system of claim 4, wherein the session database validates the session ID, wherein, based on the validation of the session ID, a session is launched, wherein the session connects to the secure environment.

6. The system of claim 5, wherein the session is rendered by a thin client process.

7. The system of claim 6, further comprising a data translation server, wherein the thin client process decrypts and renders data received by the data translation server.

8. The system of claim 1, further comprising disposing the secure web container within the secure environment thereby protecting user data from unauthorized access.

9. The system of claim 2, wherein the policies further comprise first behavioral rules that are defined and applied as global policies.

10. The system of claim 3, wherein the policies further comprise second behavioral rules that are defined and applied on a per-downstream website basis, such that the policies comprising the second behavioral rules are specific to at least one of the following: a particular website account and a destination site.

11. A method for providing a secure online environment for interacting with downstream sites using web-based applications, the method comprising the steps of:
   providing a client device interface comprising a secure channel operable to communicate with a user client device through an image protocol, wherein commands from a downstream site are not passed from the downstream site to the user client device;
   providing a policy database operable to store policies for user access to and interaction with the downstream site, the policy database comprising policy information;
   providing a policy portal in communication with the policy database, the policy portal operable to provide access to an administrator for configuring the policies for user access to and interaction with the downstream site;
   providing an authenticated service device in communication with the client device interface and the policy database, wherein the authenticated service device is operable to access and interact with the downstream site at the user client device and the authenticated service device further comprises a secure environment and a secure web container within the secure environment; and
   providing a secure data store in communication with the authenticated service device, the secure data store operable to store user credentials for accessing and interacting with the downstream site in accordance with the policies stored in the policy database,
   wherein the authenticated service device is operable to authenticate to the downstream site based on the user credentials, and provide, using the image protocol and via the client device interface, content associated with the downstream site to the user client device.

12. The method of claim 11, wherein the policy database further comprises policies stored within the policy database that allow for behavioral rules to define user access to and interaction with the downstream site.

13. The method of claim 11, wherein the user credentials are fetched from within the secure environment, such that automatic downstream site logins are provided without transmitting the user credentials to the user client device.

14. The method of claim 11, further comprising creating a session ID, wherein the session ID is assigned in a session database and wherein the session ID is associated with a user.

15. The method of claim 14, wherein the session database validates the session ID, wherein, based on the validation of the session ID, a session is launched, wherein the session connects to the secure environment.

16. The method of claim 15, wherein the session is rendered by a thin client process.

17. The method of claim 16, further comprising a data translation server, wherein the thin client process decrypts and renders data received by the data translation server.

18. The method of claim 11, further comprising disposing the secure web container within the secure environment thereby protecting user data from unauthorized access.

19. The method of claim 12, wherein the policies further comprise first behavioral rules that are defined and applied as global policies.

20. The method of claim 13, wherein the policies further comprise second behavioral rules that are defined and applied on a per-downstream website basis, such that the policies comprising the second behavioral rules are specific to a particular website account or a destination site.

\* \* \* \* \*